United States Patent
Chan et al.

(10) Patent No.: US 6,381,603 B1
(45) Date of Patent: Apr. 30, 2002

(54) SYSTEM AND METHOD FOR ACCESSING LOCAL INFORMATION BY USING REFERENCING POSITION SYSTEM

(75) Inventors: Jawe Chan; Ting-Mao Chang, both of San Jose, CA (US)

(73) Assignee: Position IQ, Inc., San Jose, CA (US)

( * ) Notice: Subject to any disclaimer, the term of this patent is extended or adjusted under 35 U.S.C. 154(b) by 0 days.

(21) Appl. No.: 09/253,931

(22) Filed: Feb. 22, 1999

(51) Int. Cl.$^7$ .............................................. G06F 17/30
(52) U.S. Cl. ................... 707/10; 707/3; 707/5; 707/102; 701/201; 701/207; 701/213; 705/26; 705/27; 709/203
(58) Field of Search ............................ 707/3, 10, 102, 707/5; 705/26, 27; 701/201, 207, 213; 709/203

(56) References Cited

U.S. PATENT DOCUMENTS

| | | | | |
|---|---|---|---|---|
| 5,751,246 A | * | 5/1998 | Hertel | 342/357.07 |
| 5,802,492 A | * | 9/1998 | DeLorme et al. | 455/456 |
| 5,839,088 A | * | 11/1998 | Hancock et al. | 701/213 |
| 5,867,799 A | | 2/1999 | Lang et al. | 707/1 |
| 5,870,741 A | * | 2/1999 | Kawabe et al. | 707/5 |
| 5,948,040 A | * | 9/1999 | DeLorme et al. | 701/201 |
| 5,950,173 A | * | 9/1999 | Perkowski | 705/26 |
| 6,002,853 A | * | 12/1999 | de Hond | 395/200.49 |
| 6,055,516 A | * | 4/2000 | Johnson et al. | 705/27 |

* cited by examiner

*Primary Examiner*—Jean R. Homere
(74) *Attorney, Agent, or Firm*—Skjerven Morrill MacPherson, LLP

(57) ABSTRACT

A system and method for accessing local information in a database. The database is organized with merchandise information including identifier of information provider, identifier information, position information, and description information. The position information is position coordinates of a Global Position System that provides an accurate and fast location search capability of the database. The user of an end-user computer system is able to search the database by sending a query to a remote server computer system. The query includes searching geographic area and searching criteria. After receiving the query, the server computer system 10 then queries the database and receives information from the database query. The server computer 10 returns the search result to the user's computer system. The returned search result includes the identifier of the information provider, identifier of the information, description of information that matches the searching criteria, and position coordinates. The position coordinates may be further utilized by other Global Position System applications, for example route search and navigation.

102 Claims, 13 Drawing Sheets

SYSTEM AND METHOD FOR ACCESSING LOCAL INFORMATION BY USING REFERENCING POSITION SYSTEM

BACKGROUND

1. Field of the Invention

This invention relates to a local information access system and method that stores and retrieves information located at or close to a location.

2. Description of Prior Art

The Internet is a revolutionary technology to access information. Through the Internet, users can access information from around the world with the click of a mouse button. They can access information related to a company on the other side of earth at their home. The Internet is a powerful and convenient media to provide or receive information. Companies are promoting their product information and services or making direct sales online. To access information, the user either needs to know the web site address of the information or use a search engine to search for the information. The user needs to provide the search engine some key words that relate to the information. However, the amount of information on the Internet is explosively growing. The user could receive thousand of related pieces of information from a search engine. In many cases, the user only needs the local information instead of global information.

The prior art used to deal with the explosive global information problem categorizes the information. Most of the search engines on the Internet categorize the information by the information characteristics. For example, Yahoo Inc. categorizes their database into automobile, travel, computer, political, stock quotes, etc. The user could choose the category to do the search. This approach might reduce the quantity of information returned from a search. However, it is still too much information and contains the global information within that category.

Some of the companies on the Internet further categorize their information by the geographic areas, for example countries or cities. With the geographic area category, the user could search the information only in a predefined area, which usually is a government district, for example ZIP code area, city, county, state, and country, etc. One example is the Sidewalk WEB site of Microsoft Corp. The WEB site provides a utility to locate the stores by Boolean search criteria and an area, which could be a ZIP code, a city, a county, a state, and a country. After it finds the stores, it returns a map and shows the store location by making a mark on the returned map. It has the disadvantage that the searching area is predefined, meaning that the user could not choose as they wish, for example to cross city limits or to narrow down to a shopping mall. Another disadvantage is the information returned is limited to store location without any merchandise information to help shopping. There are no driving directions to the shopping location except the map. Also, the information may not be up to date, for example, the store may have moved.

Another prior art system is found in most of the Global Position System (GPS) applications. The current Global Position System is more popular in Europe and Japan than in the United States. The Global Position System receiver receives the signals from several satellites and then determines its current position. The Global Position System receiver usually has a built-in small computer. The computer has a display that could display a simplified map and show the current position on the map. The map is either pre-stored in the computer or could be downloaded from a remote site through a wireless connection. The program runs on the computer and could use the current position coordinates to search a built-in database for the closest gas stations, hospitals, or restaurants. The built-in database is stored in a memory device of the computer, for example, flash memory or a CD-ROM. It has the disadvantages that information might be out dated and the searching area is not selectable.

SUMMARY OF THE INVENTION

A convenient and flexible local information searching system is provided, which quickly builds and retrieves the information corresponding to a location. The preferred embodiment of this invention utilizes the Internet as media to distribute and build up the information and a database with position coordinates of a Global Position System to search the information.

There are two users of this system: one is the information provider and the other is the information consumer. The information provider provides information stored in the database of this invention. The information consumer retrieves information from the database of this invention and utilizes the information for a variety purposes. The typical user of this invention is equipped with a computer with a modem. The user computer dials up an Internet Service Provider (ISP) through the modem and phone connection to access to the Internet.

The server computer system of this invention is provided to serve two types of users. The preferred server computer system in the embodiment is equipped with a computer, a networking device to an Internet Service Provider with a high-speed data communication link. The Internet Service Provider then connects to the user's computer system through another Internet Service Provider that serves the user computer system. The server computer system also couples to a database for storing and querying information in the database.

In the preferred embodiment, the information provider uses a computer to communicate with the server computer via the Internet and update their information in the database as frequently as they need. Therefore, the information in the database would be up to date because the information is updated upon the information provider's demand. The provided information is comprised of the identifier of the information provider, the location related to the information, and other information descriptions. The location could be an address or the position coordinates of the Global Position System. If the location is an address, the server computer system converts the address into the related position coordinates of the Global Position System. The server computer system, then, stores the information and the position coordinates into the database.

An information consumer uses the computer to communicate with the server computer system via the Internet and for querying the database. The query is for searching the information that is located in a user-specified area and matching searching criteria. The searching area in the query is derived from a position and searching area constraint input by the user. In the preferred embodiment, Global Position System (GPS) coordinates are used to describe the position. The user chooses the searching area constraint and a position to decide the area in which he or she would like to do the information search. If the user does not specify a searching area constraint, the preferred embodiment of this invention then takes a default searching area constraint. The position could be stored in a memory of the user's computer and the user uses the stored position to query the system of this invention. If a GPS receiver is connected with the user's computer, the computer could periodically update the position by receiving information from the GPS receiver. The searching area could be close to the user's current position in real time. It is especially convenient if the user is driving a vehicle. The user could certainly manually enter a GPS position in the query if the user does not have a GPS receiver or wants to query information outside of the user's current position.

The local computer could be a hand held computer or some portable computer. The user could install a miniature computer with a GPS receiver on a car and access the Internet through a cellular phone or some wireless connection to the system of this invention. The information retrieved by the present invention would be quickly changed corresponding to the new position identified by GPS receiver.

The information in the database of the preferred embodiment of this invention contains the GPS position coordinate information. With this information, the system of this invention could do an accurate search and also return search results with the information position coordinates for use with navigation and routing applications. In the preferred embodiment, the search results include a map that is marked with the found information according to their position on the map. The returned information position coordinates will be used for determining the best route and real time navigation when incorporated with a GPS receiver.

Accordingly, besides the objects and advantages of the /system and method for accessing local information described above, several objects and advantages of the present invention are:

(a) to provide an efficient system and method for a local information provider to distribute their information to a local information consumer, (b) to provide a convenient and fast local information searching system and method which could find information in a user specified searching area, and match user specified criteria, (c) to provide a fast and accurate local information search by utilizing the Global Position System coordinates, (d) to provide a flexible, local information searching system and method with highly adjustable searching area, for example, crossing city boundaries or even narrowed down to a shopping mall area, (e) to provide a system and method to couple an information search with Global Position System Navigation to further help an information consumer drive to the found information position, and (f) to provide a system and method to couple an information search with a best route to a position of found information, and best route could takes both traffic and distance in to consideration.

DETAILED DESCRIPTION

Figure 1:
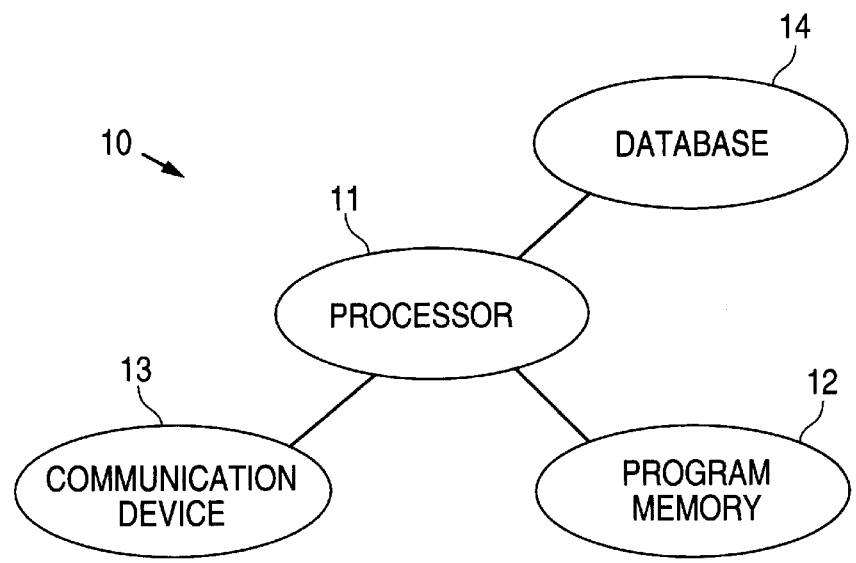
FIG. 1 shows a server computer system.

FIG. 1 illustrates an example of a server computer system 10 for storing and retrieving merchandise data in accordance with the invention. Computer system 10 comprises a processor 11, program memory 12, a communication device 13, and a merchandise database 14. The communication device 13 might be a modem or a high-speed leased line router. In the embodiment of FIG. 1, system 10 is an information sever, and processor 11 is in data communication with the various end-user computer system via the Internet. However, in other embodiments, the invention could be implemented with a processor having multiple modems to receive calls directly from end-user computer systems and establish the data communication via the modems and public phone lines.

Figure 2:
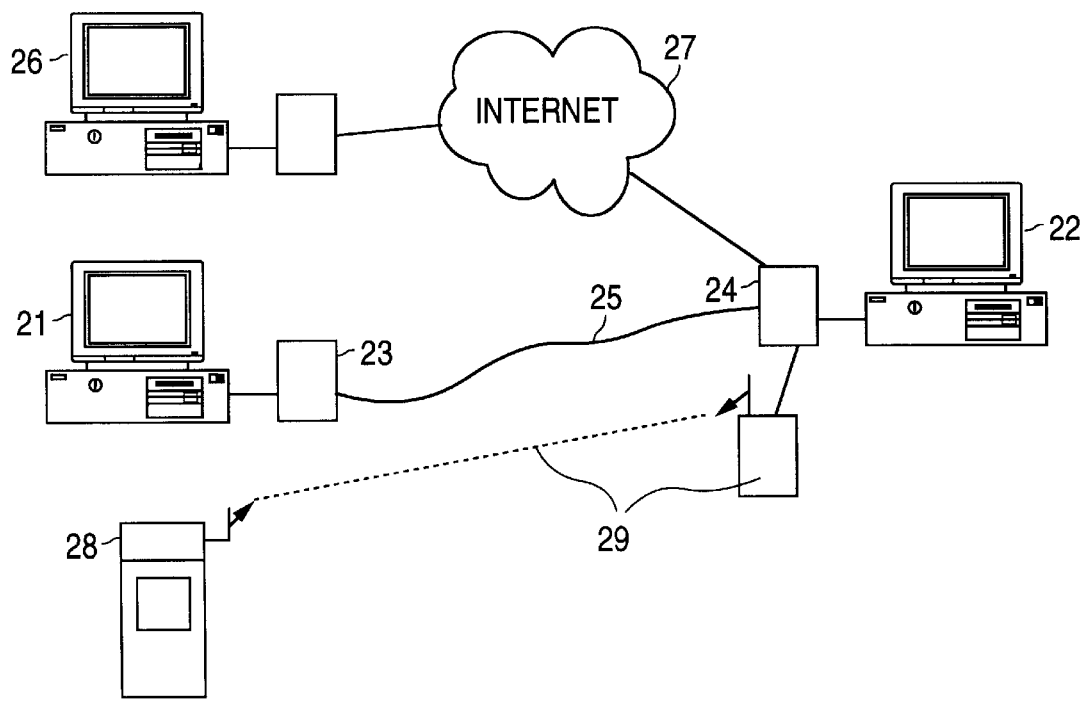
FIG. 2 shows end-user computers communicating with the server computer in a variety of ways.

FIG. 2 shows end-user computers communicating with the server computer in a variety of ways. End-user computer system 21 connects to server computer system 22 via modem 23 and modem 24 through phone line 25. Another example shows end-user computer system 26 connected to server computer system 22 through the Internet 27. End-user computer system 28 connects to server computer system 22 through radio frequency link 29.

An example of a suitable computer system 10 is one operating in accordance with the Sun MicroSystems Solaris operating system. Processor 11 may be any general-purpose processor having a CPU, RAM, ROM, and I/O circuitry.

To explain further, one aspect of the invention is the use of computer system 10 to access merchandise database 14 to provide a user with merchandise information within a given area. In the example of this description, database 14 is a centralized database system and stores the data about merchandise information in the worldwide area. However, in other embodiments, database 14 might be implemented as a distributed database system, which stores the information in several computer systems and might be located in different areas. Each distributed database might store data about merchandise information in a local area, such as a particular state or country.

Database 14 of the embodiment is implemented in a relational database manner. Each piece of merchandise information is organized as a record in the database to describe a piece of merchandise, having a field for each merchandise information record to describe the merchandise and for searching of records of merchandise information describing that merchandise. Another field in each merchandise information record in a position field. The position field has position coordinates of the merchandise. The position coordinates include the latitude and longitude of Global Position System coordinates. It could also contain the altitude coordinate of the Global Position System when it is necessary. The database 14 could also be arranged in an object-oriented manner for attribute searching.

Figure 3:
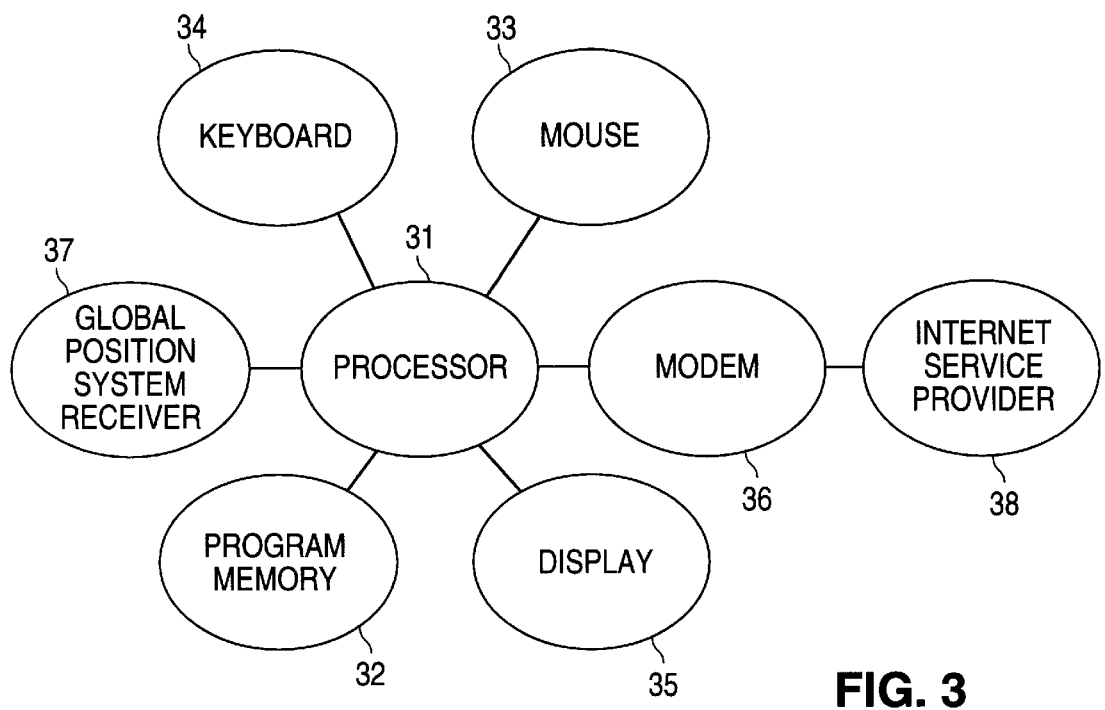
FIG. 3 shows an end-user computer system.

FIG. 3 illustrates an example of an end-user computer system 30 for retrieving merchandise information in accordance with the invention. Computer system 30 comprises a processor 31, program memory 32, a mouse 33 and keyboard 34 for user input, a display 35, a modem 36, Global Position System receiver 37, and Internet Service Provider (ISP) 38. In the embodiment of FIG. 2, system 30 is an end-user computer system, and processor 11 is in data communication with an Internet Service Provider 38 first and then the Internet Service Provider transmits the data to the computer system in FIG. 1 via the Internet. However, in other embodiments, the invention could be implemented with a processor having a modem call directly to the computer systems in FIG. 1 and establish the data communication link via the modems. Or, the invention could be implemented such that the end-user computer system in FIG. 2 and server computer system in FIG. 1 is in a local area network (LAN) or a wide area network (WAN).

In the embodiment of FIG. 2, Global Position System receiver 37 is a positioning instrument, and is used as a current position coordinate input device for computer system 30. However, in other embodiments, the user of computer system 30 could input the position coordinates from another input device, for example from a keyboard 34, if the user knows his or her current position or would like to search merchandise information at another location.

An example of a suitable end-user computer system 30 is one operating in accordance with the Microsoft WINDOWS operating system. Processor 11 may be any general-purpose processor having a CPU, RAM, ROM, and I/O circuitry. Other input devices instead of, or in addition to, mouse 33 and keyboard 34 could be used, such as trackballs, touch pads, graphic tablet, or joysticks. The processor 11 is programmed to execute a process to help the user and take the user's input.

Figure 4:
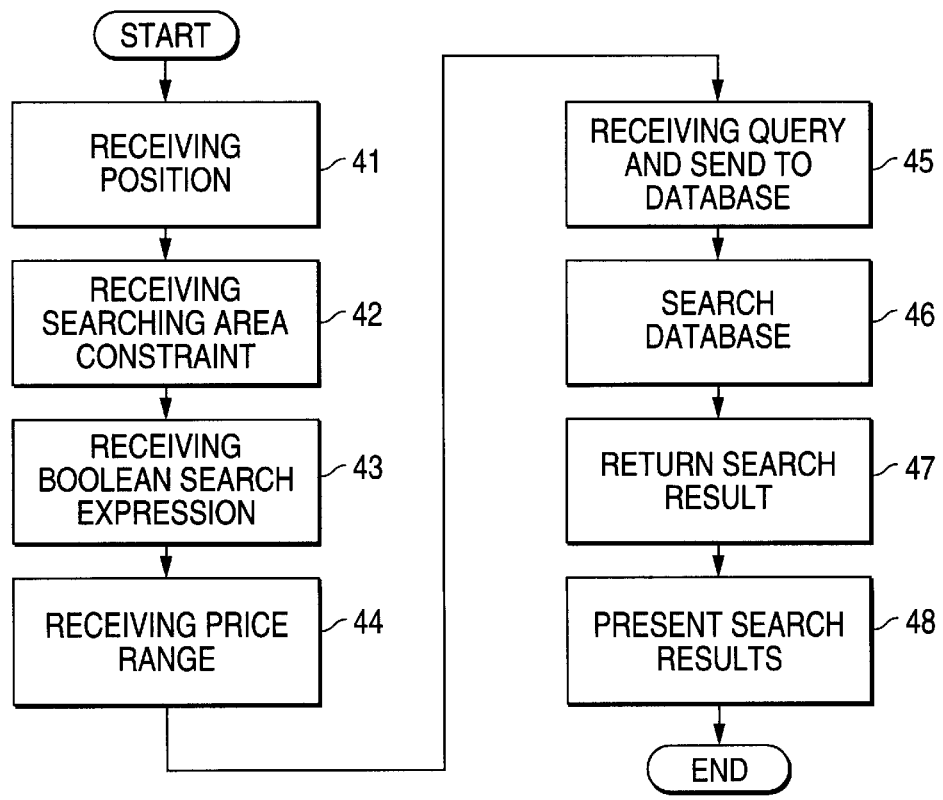
FIG. 4 shows a flow chart of the merchandise inquiry process.

FIG. 4 illustrates the merchandise information inquiry process in a preferred embodiment, executed by processor 31. The process is interactive, with processor 31 responding to input by the user via a trackball device (mouse) 33 or keyboard 34. As is common with today's personal computer systems, mouse 33 is used to point a cursor at an icon, button, or other graphical prompt and to click on that prompt to initiate processor activity.

Figure 5:
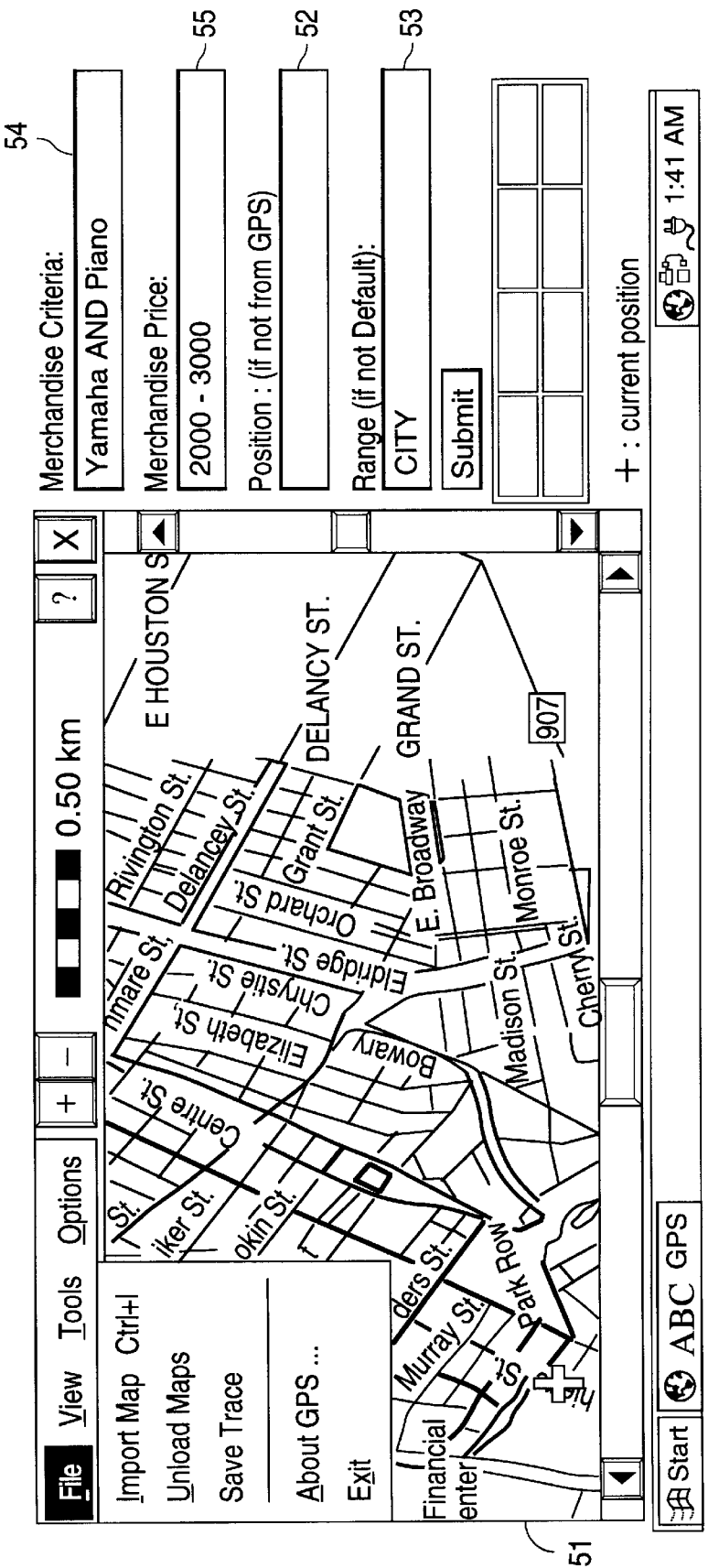
FIG. 5 shows a graphical user interface for the user to input the query.

FIG. 5 illustrates the graphical user interface used between step 41 to step 43 to receive input from the user. The graphical user interface is a form displayed on display 35. There are several input boxes and buttons on the graphical user interface to accept input from the user. On the graphical user interface, a cursor 51 indicates where the user enters input. The user uses mouse 33 to control the movement of the cursor 51 on the graphical user interface.

Box 52 accepts input for a position. The position is a location in an area where the user would like to search for merchandise. The position is the position coordinates of the Global Position System. The position coordinates include at least longitude and latitude. Altitude is optional for the user. If the user doesn't know the position coordinates of the searching area, he or she could type in an address in Box 52. Most of the time, the user may be interested in the area that is the user's current position. The user could choose the current position as the focal point by leaving Box 52 empty. The current position is stored in program memory 32. It could be an address or position coordinates. By default, the current position is chosen unless the user inputs other address or coordinates in the Box 52. If end-user computer system 30 contains a Global Positioning System receiver 37, processor 31 could also continuously update the current position coordinates with the reading from Global Positioning System receiver 37. In step 41, processor 31 then receives the position from Box 52 if the position is given. Or, processor 31 receives the current position from program memory 32.

Box 53 accepts input for a searching area constraint. The searching area constraint and the position in Box 43 together define a geographic area in which the user would like to search for merchandise. There are many ways to specify the searching area constraint. The searching area constraint could be a distance. The distance describes a circular area that is centered at the position specified by Box 52. The searching area constraint could be a keyword "ZIP", which is a zip code area in which the position in Box 52 is located. It could be a keyword "CITY", which is a city area in which the position in Box 52 is located. Or, it could be "STATE", which is a state area in which the position in Box 52 is located. Or, it could be any term to represent a government district. In step 42, processor 31 receives the searching area constraint from Box 53. In FIG. 5, a "CITY" searching area constraint is selected.

Box 54 accepts input for search criteria. The search criteria is a single keyword or a Boolean search expression, which combines several keywords with Boolean operations. For example, the user would like to search for a Yamaha piano. The user could use "Yamaha AND piano", where AND is the Boolean operation and "Yamaha" and "piano" are keywords. In step 43, the user inputs search criteria in Box 54, then, processor 31 receives the search criteria from Box 54.

Box 55 accepts input for price range. In the example, a price range between 2000 to 300 dollars is chosen. The price range is to set a range on the price of merchandise for which user is searching. Therefore, all of the merchandise found is within the price range. In step 44, processor 31 receives the price range in Box 55.

In step 45, processor 31 organizes the received input, position, searching area constraint, search criteria, and price range, as a query and sends it to a Internet Service Provider 38 via modem 36 and phone line. Then, the Internet Service Provider further transmits the query to computer system 10. After receiving the query, processor 11 then queries database 14.

In step 46, database 14 receives the query and searches the data in the database against the searching area. Received search criteria and received price range further qualify the search results. Only the search results that are located in the searching area, match the search criteria, and are within the price range are returned to processor 11. Each of the search results includes the merchandise description, merchandise price, and merchandise location. Processor 11 further queries a map database, which is not shown on FIG. 1, by giving the searching area. The map database then returns a map, which covers the searching area. Processor 11 then marks the map with index numbers. Each index number corresponds to a search result. In step 47, processor 11 transmits received search results to Internet Service Provider 38 via the Internet, and the Internet Service Provider 38 transmits the results to computer system 30. In another embodiment, process 11 might only return the search results and not include the map.

Figure 6:
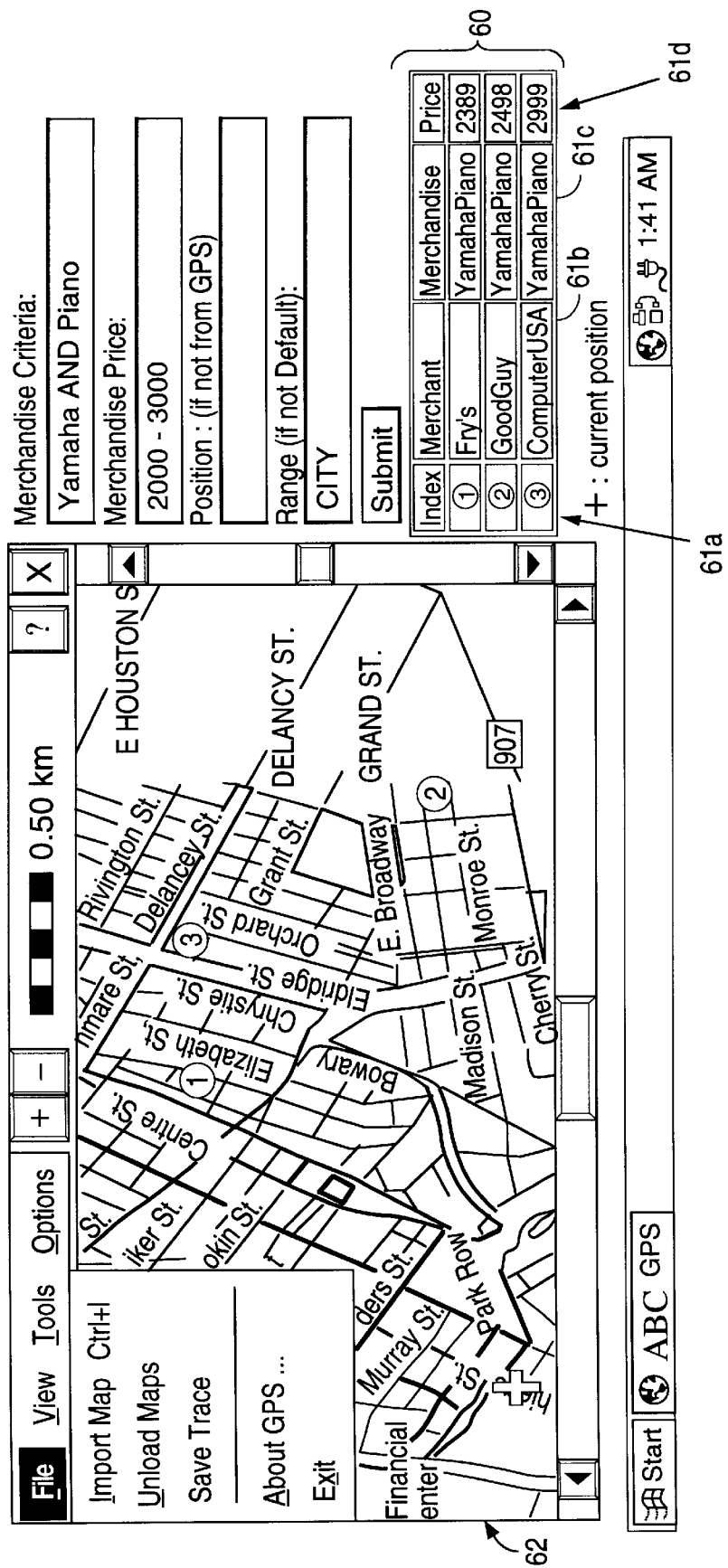
FIG. 6 shows a graphical user interface to display the search results.

In step 48, processor 31 receives the search results and displays the results as in FIG. 6. In FIG. 6, table 61 includes a field for merchandise index 61a, a field for identifier of store 61b, a field for an identifier or merchandise 61c, and a field for the price of the merchandise 61d. In another embodiment, Table 61 might also contain a field for a description of merchandise and a field for position of the merchant. In the example of FIG. 6, three items are found and the map 62 is marked with three numbers from 1 to 3. Each index number on map 62 is an index to one of the merchandise items on Table 61.

Figure 7:
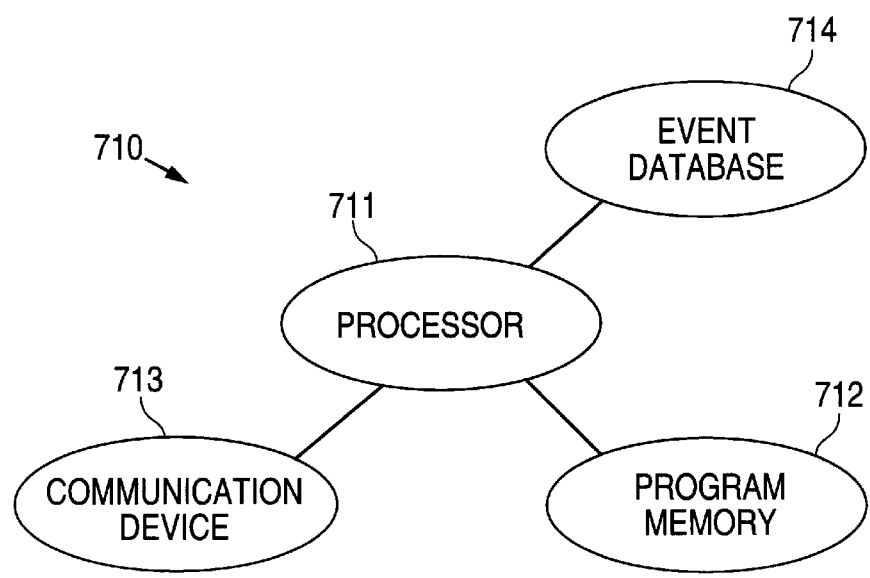
FIG. 7 shows a server computer system with event database.

FIG. 7 illustrates an example of a server computer system 710 for storing and retrieving event data in accordance with the invention. Computer system 710 comprises a processor 711, program memory 712, a communication device 713, and an event database 714. The communication device 713 might be a modem or a high-speed leased line router. In the embodiment of FIG. 7, system 710 is an information server, and processor 711 is in data communication with the various end-user computer systems via the Internet. However, in other embodiments, the invention could be implemented with a processor having multiple modems to receive calls directly from end-user computer systems and establish the data communication via the modems and public phone lines.

Figure 8:
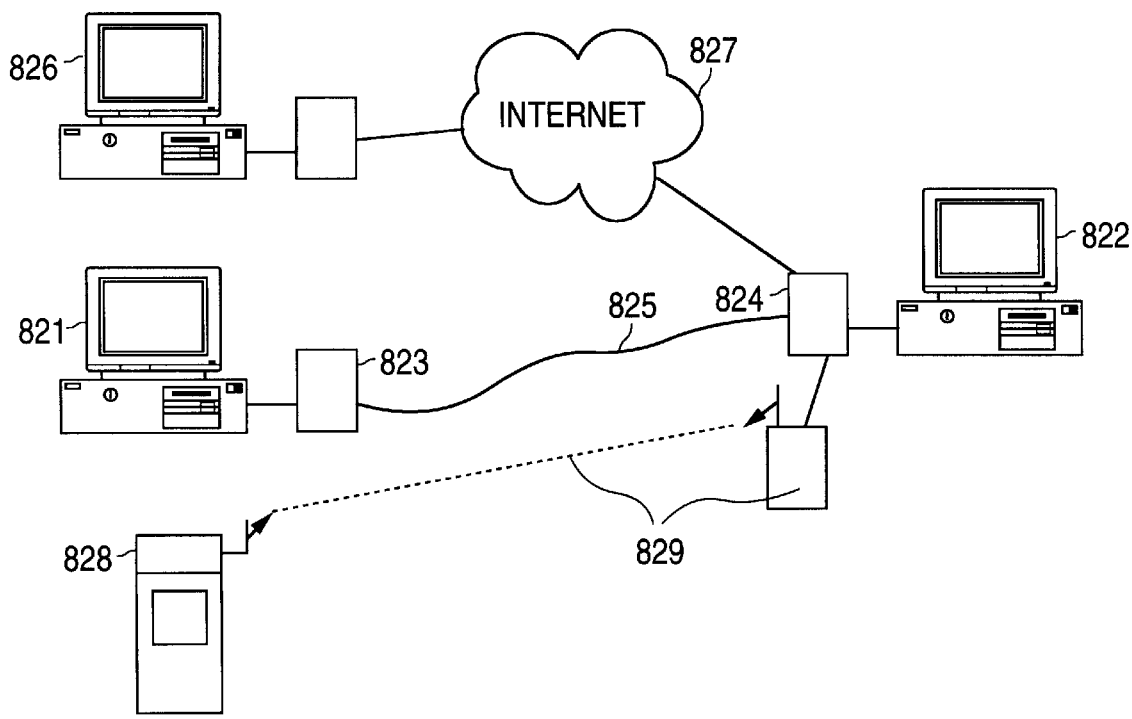
FIG. 8 shows end-user computers communicating with the server computer in a variety of ways.

FIG. 8 shows end-user computers communicating with the server computer in a variety of ways. End-user computer system 821 connects to server computer system 822 via modem 823 and modem 824 through phone line 825. Another example shows end-user computer system 826 connected to server computer system 822 through the Internet 827. End-user computer system 828 connects to server computer system 822 through radio frequency link 829.

An example of a suitable computer system 710 is one operating in accordance with the Sun MicroSystems Solaris operating system. Processor 711 may be any general-purpose processor having a CPU, RAM, ROM, and I/O circuitry.

To explain further, one aspect of the invention is the use of computer system 710 to access event database 714 to provide a user with event information within a given area. In the example of this description, event database 714 is a centralized database system and stores the data about event information in the worldwide area. However, in other embodiments, event database 714 might be implemented as a distributed database system, which stores the information in several computer systems and might be located in different areas. Each distributed database might store data about event information in a local area, such as a particular state or country.

Event database 714 of the embodiment is implemented in a relational database manner. Each piece of event information is organized as a record in the database to describe an event, having a field for each event information record to describe the event and for searching of records of event information describing that event. Another field in each event information record in a position field. The position field has position coordinates of the event. The position coordinates include the latitude and longitude of Global Position System coordinates. It could also contain the altitude coordinate of the Global Position System when it is necessary. The database 714 could also be arranged in an object-oriented manner for attribute searching.

Figure 9:
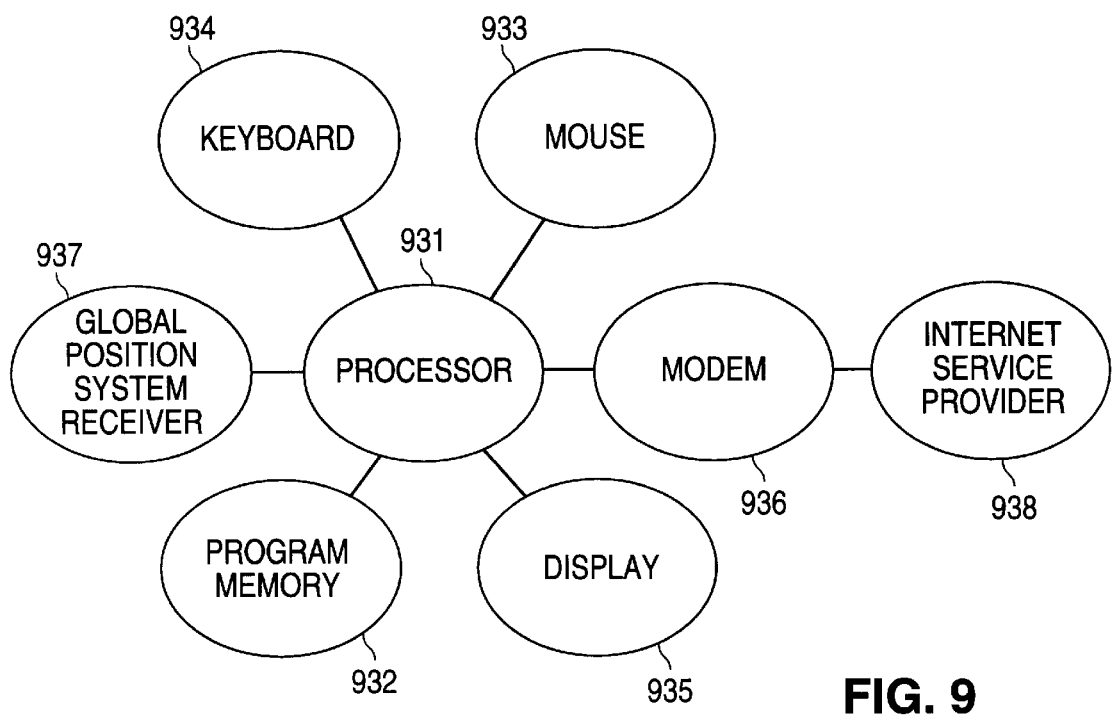
FIG. 9 shows an end-user computer system.

FIG. 9 illustrates an example of an end-user computer system 930 for retrieving event information in accordance with the invention. Computer system 930 comprises a processor 931, program memory 932, a mouse 933 and keyboard 934 for user input, a display 935, a modem 936, Global Position System receiver 937, and Internet Service Provider (ISP) 938. In the embodiment of FIG. 8, system 930 is an end-user computer system, and processor 711 is in data communication with an Internet Service Provider 938 first and then the Internet Service Provider transmits the data to the computer system in FIG. 7 via the Internet. However, in other embodiments, the invention could be implemented with a processor having a modem call directly to the computer systems in FIG. 7 and establish the data communication link via the modems. Or, the invention could be implemented such that the end-user computer system in FIG. 8 and server computer system in FIG. 7 is in a local area network (LAN) or a wide area network (WAN).

In the embodiment of FIG. 8, Global Position System receiver 937 is a positioning instrument, and is used as a current position coordinate input device for computer system 93. However, in other embodiments, the user of computer system 930 could input the position coordinates from another input device, for example from a keyboard 934, if the user knows his or her current position or would like to search event information at another location.

An example of a suitable end-user computer system 930 is one operating in accordance with the Microsoft WINDOWS operating system. Processor 711 may be any general-purpose processor having a CPU, RAM, ROM, and I/O circuitry. Other input devices instead of, or in addition to, mouse 933 and keyboard 934 could be used, such as trackballs, touch pads, graphic tablet, or joysticks. The processor 11 is programmed to execute a process to help the user and take the user's input.

Figure 10:
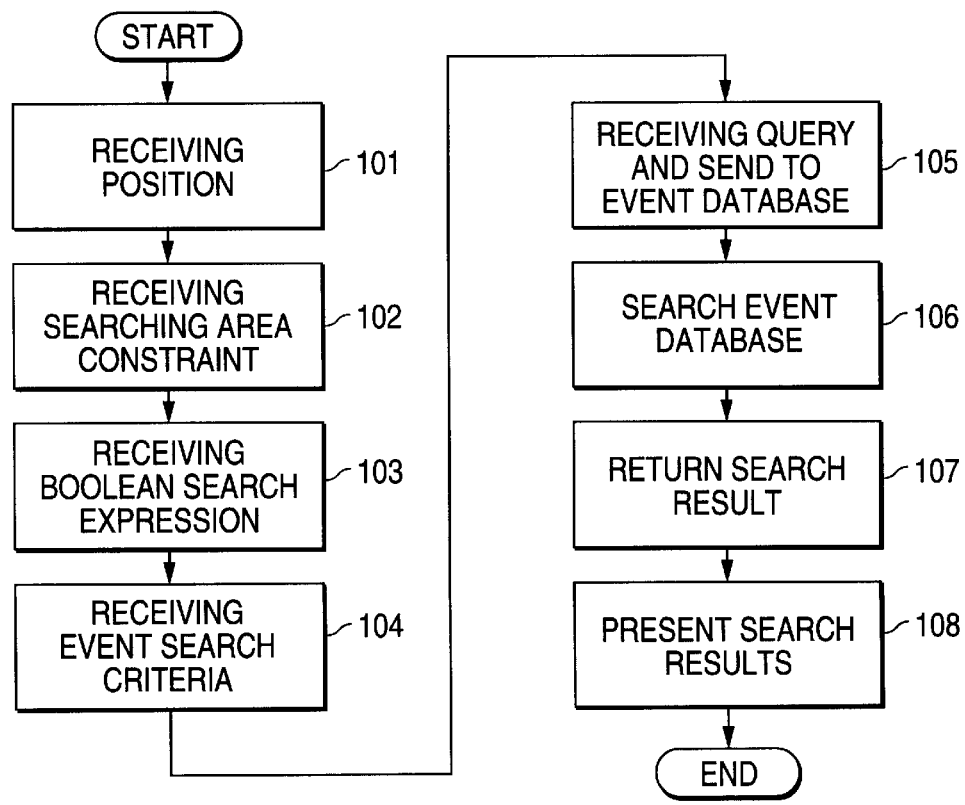
FIG. 10 shows a flow chart of the event inquiry process.

FIG. 10 illustrates the event information inquiry process in a preferred embodiment, which is executed by processor 931. The process is interactive, with processor 931 responding to input by the user via a trackball device (mouse) 933 or keyboard 934. As is common with today's personal computer systems, mouse 933 is used to point a cursor at an icon, button, or other graphical prompt and to click on that prompt to initiate processor activity.

Figure 11:
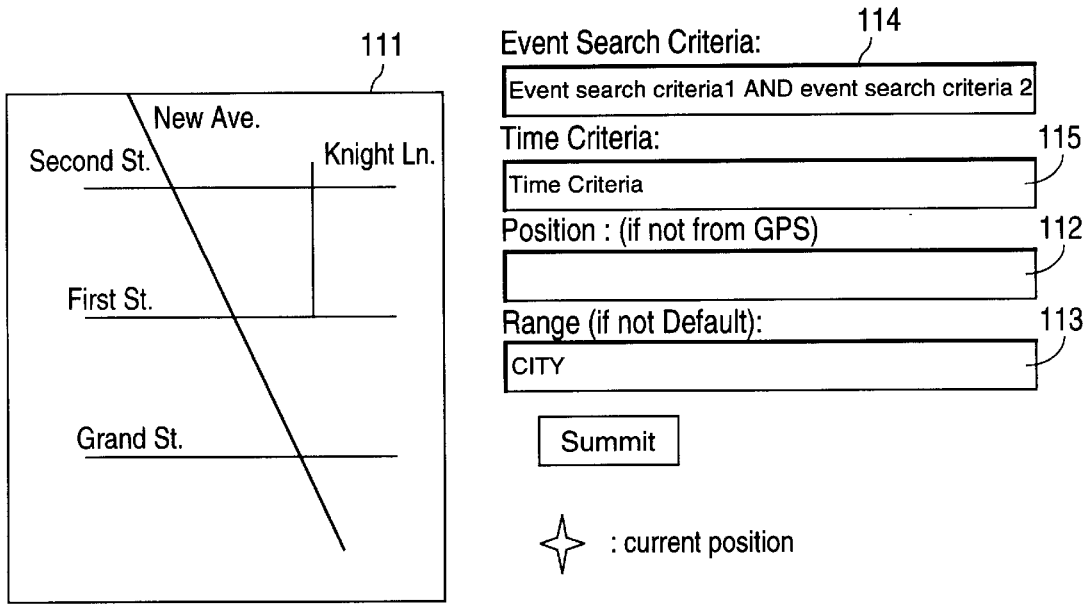
FIG. 11 shows a graphical user interface for the user to input the query.

FIG. 11 illustrates the graphical user interface used between step 101 to step 103 to receive input from the user. The graphical user interface is a form displayed on display 935. There are several input boxes and buttons on the graphical user interface to accept input from the user. On the graphical user interface, a cursor 111 indicates where the user enters input. The user uses mouse 933 to control the movement of the cursor 111 on the graphical user interface.

Box 112 accepts input for a position. The position is a location in an area where the user would like to search for event. The position is the position coordinates of the Global Position System. The position coordinates include at least longitude and latitude. Altitude is optional for the user. If the user doesn't know the position coordinates of the searching area, he or she could type in an address in Box 112. Most of the time, the user may be interested in the area that is the user's current position. The user could choose the current position as the focal point by leaving Box 112 empty. The current position is stored in program memory 932. It could be an address or position coordinates. By default, the current position is chosen unless the user inputs other address or coordinates in the Box 112. If end-user computer system 930 contains a Global Positioning System receiver 937, processor 931 could also continuously update the current position coordinates with the reading from Global Positioning System receiver 937. In step 101, processor 931 then receives the position from Box 112 if the position is given. Or, processor 931 receives the current position from program memory 932.

Box 113 accepts input for a searching area constraint. The searching area constraint and the position in Box 103 together define a geographic area in which the user would like to search for event. There are many ways to specify the searching area constraint. The searching area constraint could be a distance. The distance describes a circular area that is centered at the position specified by Box 112. The searching area constraint could be a keyword "ZIP", which is a zip code area in which the position in Box 112 is located. It could be a keyword "CITY", which is a city area in which the position in Box 112 is located. It could also be "STATE", which is a state area in which the position in Box 112 is located. Or, it could be any term to represent a government district. In step 102, processor 931 receives the searching area constraint from Box 113. In FIG. 11, a "CITY" searching area constraint is selected.

Box 114 accepts input for search criteria. The search criteria is a single keyword or a Boolean search expression, which combines several keywords with Boolean operations. For example, the user would like to search for a "Event_search_criteria1", and "Event_search_criteria2". The user could use ""Event_search_criteria2 AND Event_search_criteria2"", where AND is the Boolean operation and "Event_search_criteria1" and "Event_search_criteria2" are keywords. In step 103, the user inputs search criteria in Box 114, then, processor 931 receives the search criteria from Box 114.

Box 55 accepts input for time criteria. The time criteria is to set a criteria on the time criteria of event for which user is searching. Therefore, all of the events found are within the time criteria. In step 104, processor 931 receives the time range in Box 115.

In step 105, processor 931 organizes the received input, position, searching area constraint, search criteria, and time range, as a query and sends it to a Internet Service Provider 38 via modem 36 and phone line. Then, the Internet Service Provider further transmits the query to computer system 10. After receiving the query, processor 711 then queries database 714.

In step 106, database 714 receives the query and searches the data in the database against the searching area. Received search criteria and received time criteria further qualify the search results. Only the search results that are located in the searching area, match the search criteria, and are within the time criteria are returned to processor 711. Each of the search results includes the event description, time of event, and event location. Processor 711 further queries a map database, which is not shown on FIG. 7, by giving the searching area. The map database then returns a map, which covers the searching area. Processor 711 then marks the map with index numbers. Each index number corresponds to a search result. In step 107, processor 711 transmits received search results to Internet Service Provider 938 via the Internet, and the Internet Service Provider 938 transmits the results to computer system 930. In another embodiment, process 711 might only return the search results and not include the map.

Figure 12:
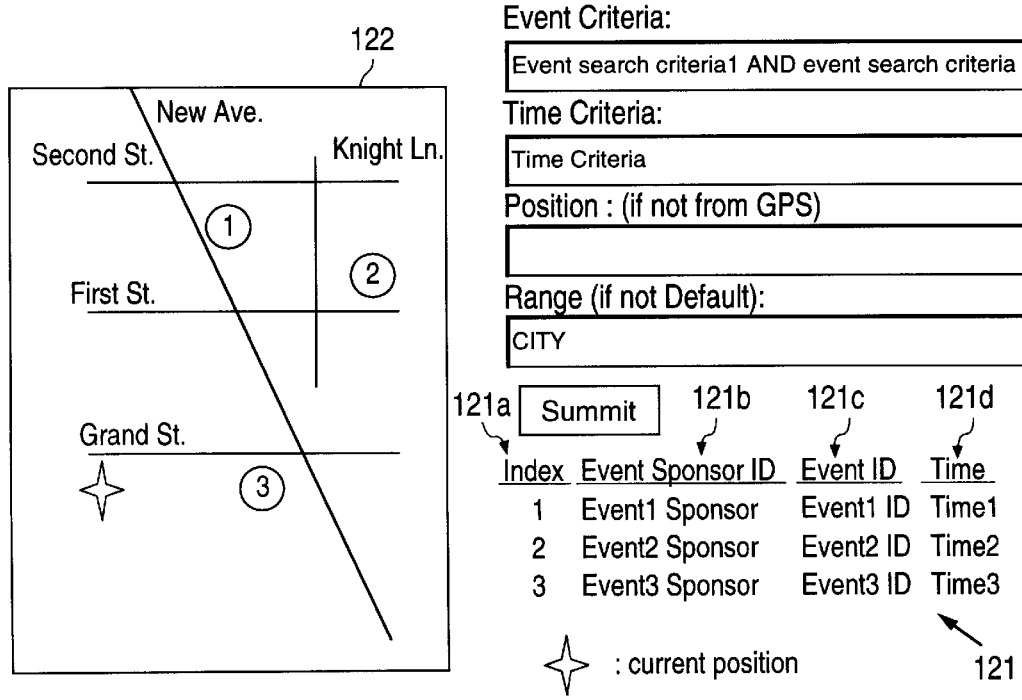
FIG. 12 shows a graphical user interface to display the event search results.

In step 108, processor 931 receives the search results and displays the results as in FIG. 12. In FIG. 12, table 121 includes a field for event index 121*a*, a field for identifier of event sponsor 121*b*, a field for an identifier of event 121*c*, and a field for the time of the event 121*d*. In another embodiment, Table 121 might also contain a field for a description of event and a field for position of the event. In the example of FIG. 12, three items are found and the map 122 is marked with three numbers from 1 to 3. For each index number on map 122 is an index to one of the events on Table 121.

Figure 13:
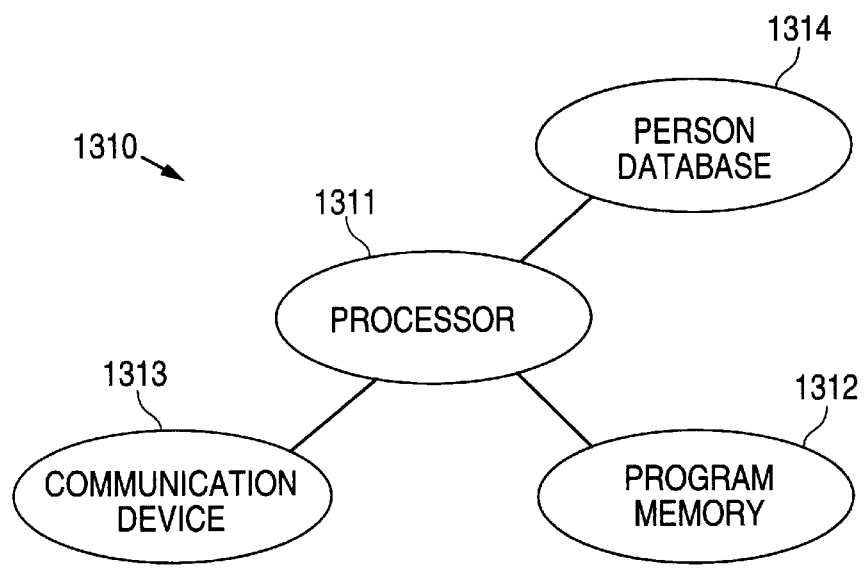
FIG. 13 shows a server computer system with personnel database.

FIG. 13 illustrates an example of a server computer system 1310 for storing and retrieving person data in accordance with the invention. Computer system 1310 comprises a processor 1311, program memory 1312, a communication device 1313, and a person database 1314. The communication device 1313 might be a modem or a high-speed leased line router. In the embodiment of FIG. 13, system 1310 is an information server, and processor 1311 is in data communication with the various end-user computer systems via the Internet. However, in other embodiments, the invention could be implemented with a processor having multiple modems to receive calls directly from end-user computer systems and establish the data communication via the modems and public phone lines.

Figure 14:
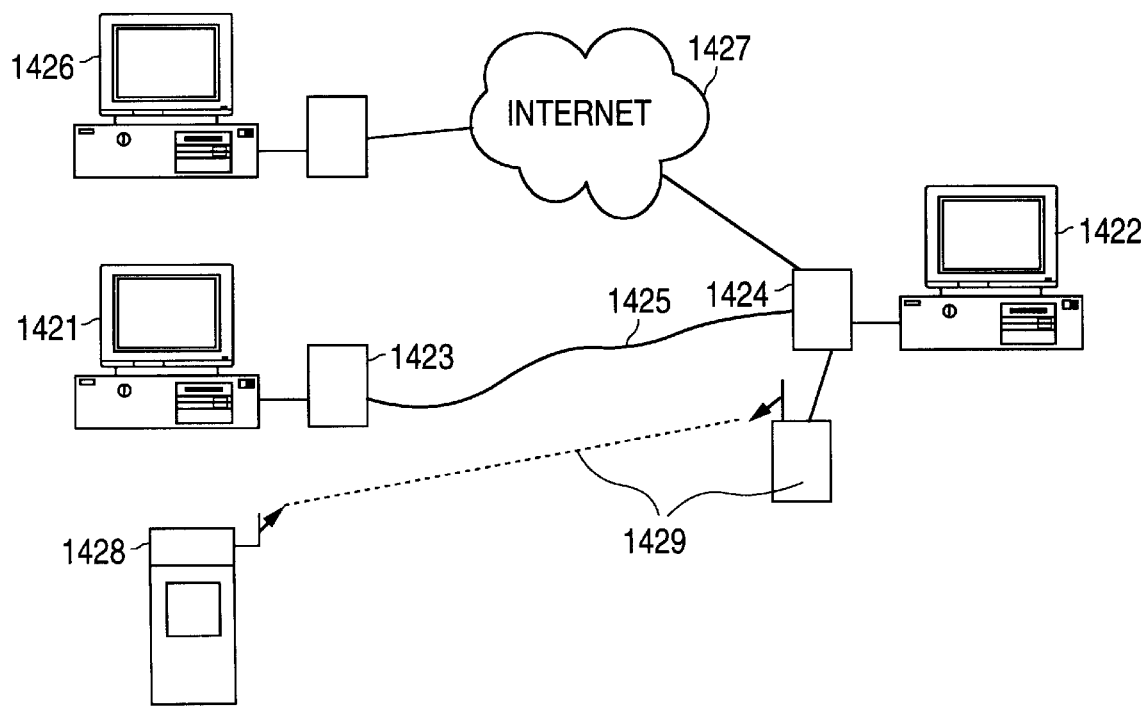
FIG. 14 shows end-user computers communicating with the server computer in a variety of ways.

FIG. 14 shows end-user computers communicating with the server computer in a variety of ways. End-user computer system 1421 connects to server computer system 1422 via modem 1423 and modem 1424 through phone line 1425. Another example shows end-user computer systems 1426 connected to server computer system 1422 through the Internet 1427. End-user computer system 1428 connects to server computer system 1422 through radio frequency link 1429.

An example of a suitable computer system 1310 is one operating in accordance with the Sun MicroSystems Solaris operation system. Processor 1311 may be any general-purpose processor having a CPU, RAM, ROM, and I/O circuitry.

To explain further, one aspect of the invention is the use of computer system 1310 to access person database 1314 to provide a user with person information within a given area. In the example of this description, personnel database 1314 is a centralized database system and stores the data about person information in the worldwide area. However, in other embodiments, personnel database 1314 might be implemented as a distributed database system, which stores the information in several computer systems and might be located in different areas. Each distributed database might store data about person information in a local area, such as a particular state or country.

Personnel database 1314 of the embodiment is implemented in a relational database manner. Each piece of person information is organized as a record in the database to describe a person, having a field for each person information record to describe the person and for searching of records of person information describing that person. Another field in each person information record is a position field. The position field has position coordinates of the person. The position coordinates include the latitude and longitude of Global Position System coordinates. It could also contain the altitude coordinate of the Global Position System when it is necessary. The database 1314 could also be arranged in an object-oriented manner for attribute searching.

Figure 15:
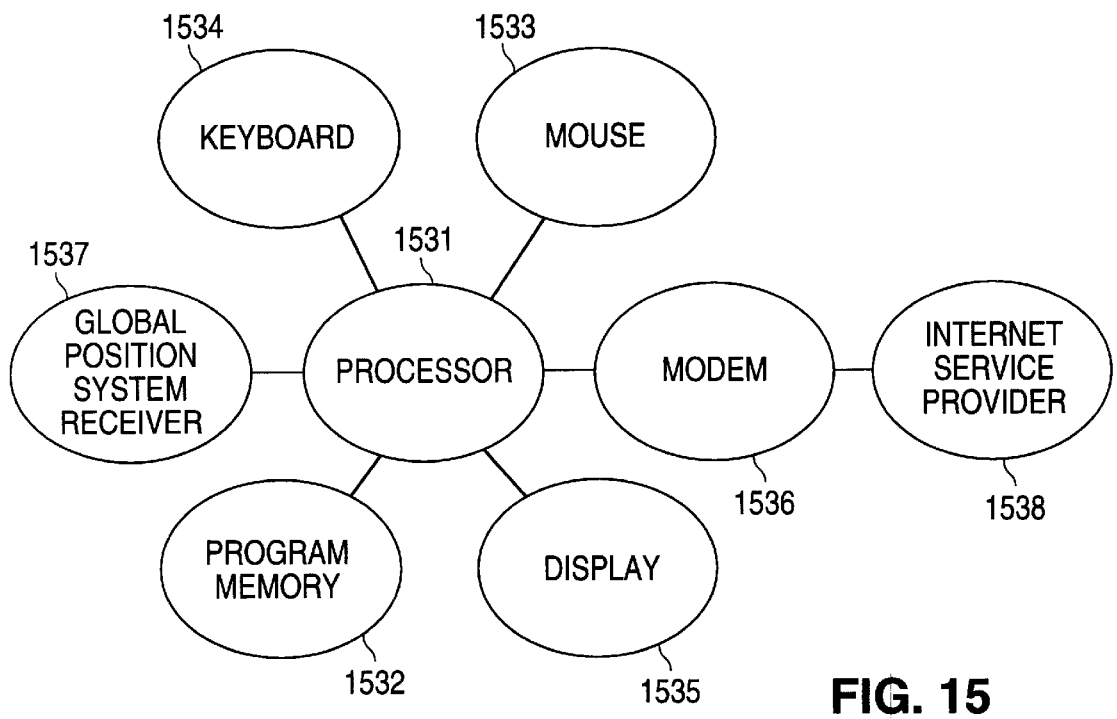
FIG. 15 shows an end-user computer system.

FIG. 15 illustrates an example of an end-user computer system 1530 for retrieving personnel information in accordance with the invention. Computer system 1530 comprises a processor 1531, program memory 1532, a mouse 1533 and keyboard 1534 for user input, a display 1535, a modem 1536, Global Position System receiver 1537, and Internet Service Provider (ISP) 1538. In the embodiment of FIG. 14, system 1530 is an end-user computer system, and processor 1311 is in data communication with an Internet Service Provider 1538 first and then the Internet Service Provider transmits the data to the computer system in FIG. 13 via the Internet. However, in other embodiments, the invention could be implemented with a processor having a modem call directly to the computer systems in FIG. 13 and establish the data communication link via the modems. Or, the invention could be implemented such that the end-user computer system in FIG. 14 and server computer system in FIG. 13 is in a local area network (LAN) or a wide area network (WAN).

In the embodiment of FIG. 14, Global Position System receiver 1537 is a positioning instrument, and is used as a current position coordinate input device for computer system 1530. However, in other embodiments, the user of computer system 1530 could input the position coordinates from another input device, for example from a keyboard 1534, if the user knows his or her current position or would like to search personnel information at another location.

An example of a suitable end-user computer system 1530 is one operating in accordance with the Microsoft WINDOWS operating system. Processor 1311 may be any general-purpose processor having a CPU, RAM, ROM, and I/O circuitry. Other input devices instead of, or in addition to, mouse 1533 and keyboard 1534 could be used, such as trackballs, touch pads, graphic tablet, or joysticks. The processor 1311 is programmed to execute a process to help the user and take the user's input.

Figure 16:
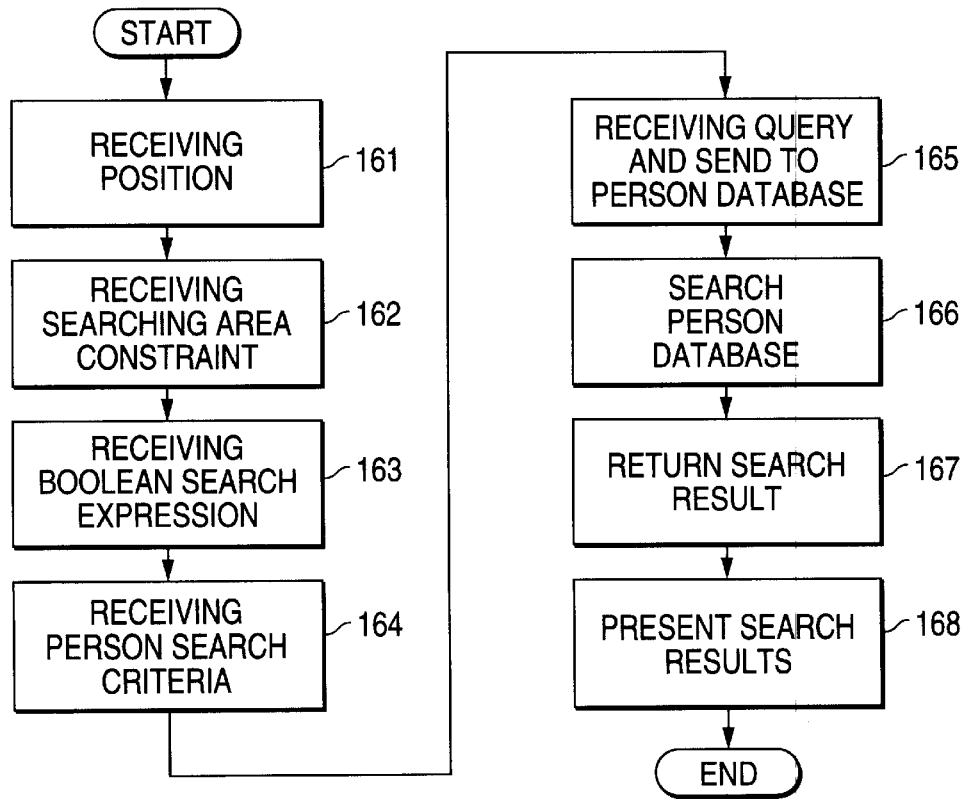
FIG. 16 shows a flow chart of the personnel information inquiry process.

FIG. 16 illustrates the personnel information inquiry process in a preferred embodiment, which is executed by processor 1531. The process is interactive, with processor 1531 responding to input by the user via a trackball device (mouse) 1533 or keyboard 1534. As is common with today's personal computer systems, mouse 1533 is used to point a cursor at an icon, button, or other graphical prompt and to click on that prompt to initiate processor activity.

Figure 17:
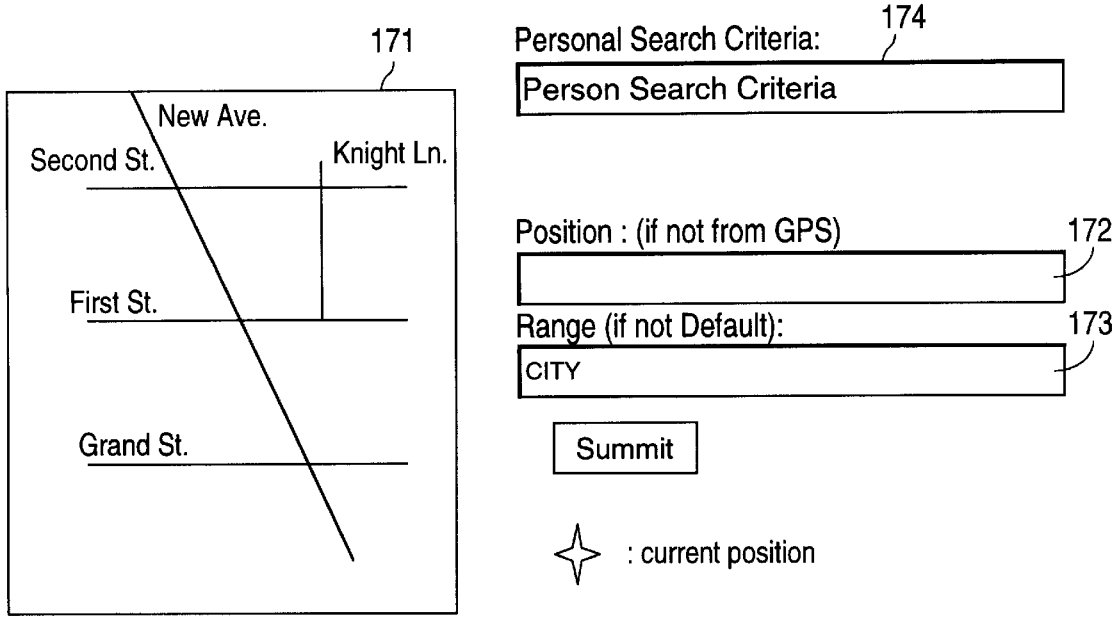
FIG. 17 shows a graphical user interface for the user to input the query.

FIG. 17 illustrates the graphical user interface used between step 161 to step 163 to receive input from the user. The graphical user interface is a form displayed on display 1535. There are several input boxes and buttons on the graphical user interface to accept input from the user. On the graphical user interface, a cursor 171 indicates where the user enters input. The user uses mouse 1533 to control the movement of the cursor 171 on the graphical user interface.

Box 172 accepts input for a position. The position is a location in an area where the user would like to search for person. The position is the position coordinates of the Global Position System. The position coordinates include at least longitude and latitude. Altitude is optional for the user. If the user doesn't know the position coordinates of the searching area, he or she could type in an address in Box 172. Most of the time, the user may be interested in the area that is the user's current position. The user could choose the current position as the focal point by leaving Box 172 empty. The current position is stored in program memory 1532. It could be an address or position coordinates. By default, the current position is chosen unless the user inputs other address or coordinates in the Box 1752. If end-user computer system 1530 contains a Global Positioning System receiver 1537, processor 1531 could also continuously update the current position coordinates with the reading from Global Positioning System receiver 1537. In step 161, processor 1531 then receives the position from Box 162 if the position is given. Or, processor 1531 receives the current position from program memory 1532.

Box 173 accepts input for a searching area constraint. The searching area constraint and the position in Box 163 together define a geographic area in which the user would like to search for person. There are many ways to specify the searching area constraint. The searching area constraint could be a distance. The distance describes a circular area that is centered at the position specified by Box 172. The searching area constraint could be a keyword "ZIP", which is a zip code area in which the position in Box 172 is located. It could be a keyword "CITY", which is a city area in which the position in Box 172 is located. It could also be "STATE", which is a state area in which the position in Box 172 is located. Or, it could be any term to represent a government district. In step 162, processor 1531 receives the searching area constraint from Box 173. In FIG. 17, a "CITY" searching area constraint is selected.

Box 174 accepts input for search criteria. The search criteria is a single keyword or a Boolean search expression, which combines several keywords with Boolean operation. For example, the user would like to search for a person with "Personnel_Information_criteria1" and "Personnel_Information_criteria2". The user could use "Personnel_Information_criteria1 AND Personnel_Information_criteria2", where AND is the Boolean operation and "Personnel_Information_criteria1" and "Personnel_Information_crtieria2" are keywords. In step 163, the user inputs search criteria in Box 174, then, processor 1531 receives the search criteria from Box 174.

In step 165, processor 1531 organizes the received input, position, searching area constraint, and search criteria, as a query and sends it to a Internet Service Provider 1538 via modem 1536 and phone line. Then, the Internet Service Provider further transmits the query to computer system 1310. After receiving the query, processor 1311 then queries database 1314.

In step 166, database 1314 receives the query and searches the data in the database against the searching area. Received personnel information search criteria further qualify the search results. Only the search results that are located in the searching area and match the search criteria are returned to processor 1311. Each of the search results includes the personnel information description, and person location. Processor 1311 further queries a map database, which is not shown on FIG. 13, by giving the searching area. The map database then returns a map, which covers the searching area. Processor 1311 then marks the map with index numbers. Each index number corresponds to a search result. In step 167, processor 1311 transmits received search results to Internet Service Provider 1538 via the Internet, and the Internet Service Provider 1538 transmits the results to computer system 1530. In another embodiment, process 1311 might only return the search results and not include the map.

Figure 18:
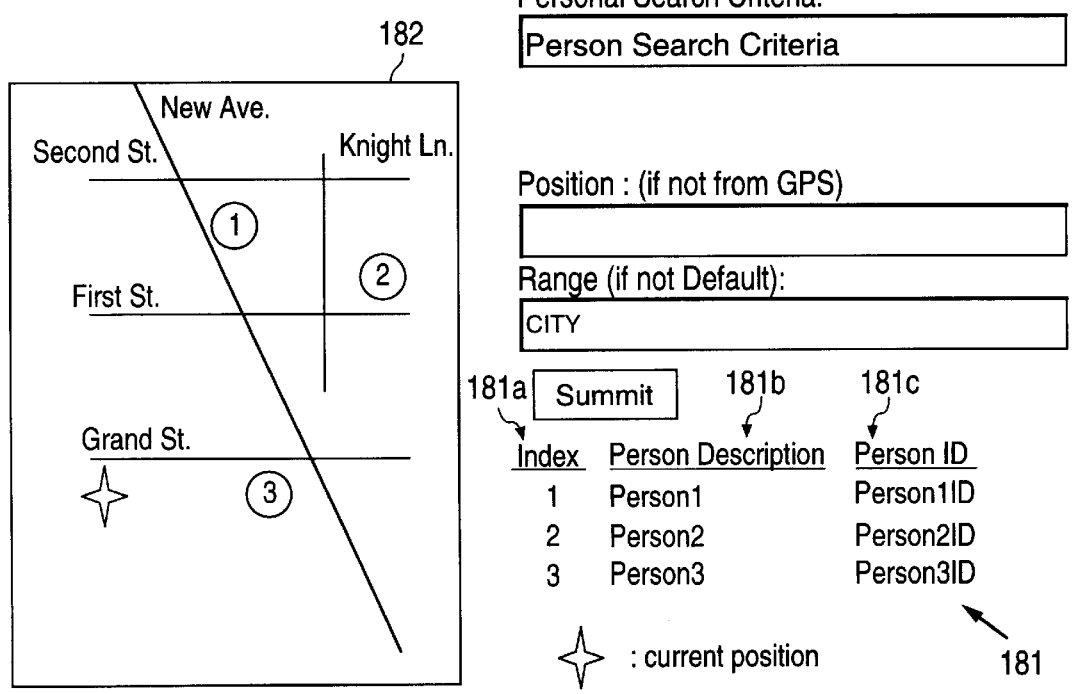
FIG. 18 shows a graphical user interface to display the personnel search results.

In step 168, processor 1531 receives the search results and displays the results as in FIG. 18. In FIG. 18, table 181 includes a field for person index 181*a*, a field for an identifier of person 181*c*, and a field for personnel information 181*d*. In another embodiment, Table 181 might also contain a field for a description of person and a field for position of the person. In the example of FIG. 18, three items are found and the map 182 is marked with three numbers from 1 to 3. Each index number on map 182 is an index to one of the person on Table 181.

Figure 19:
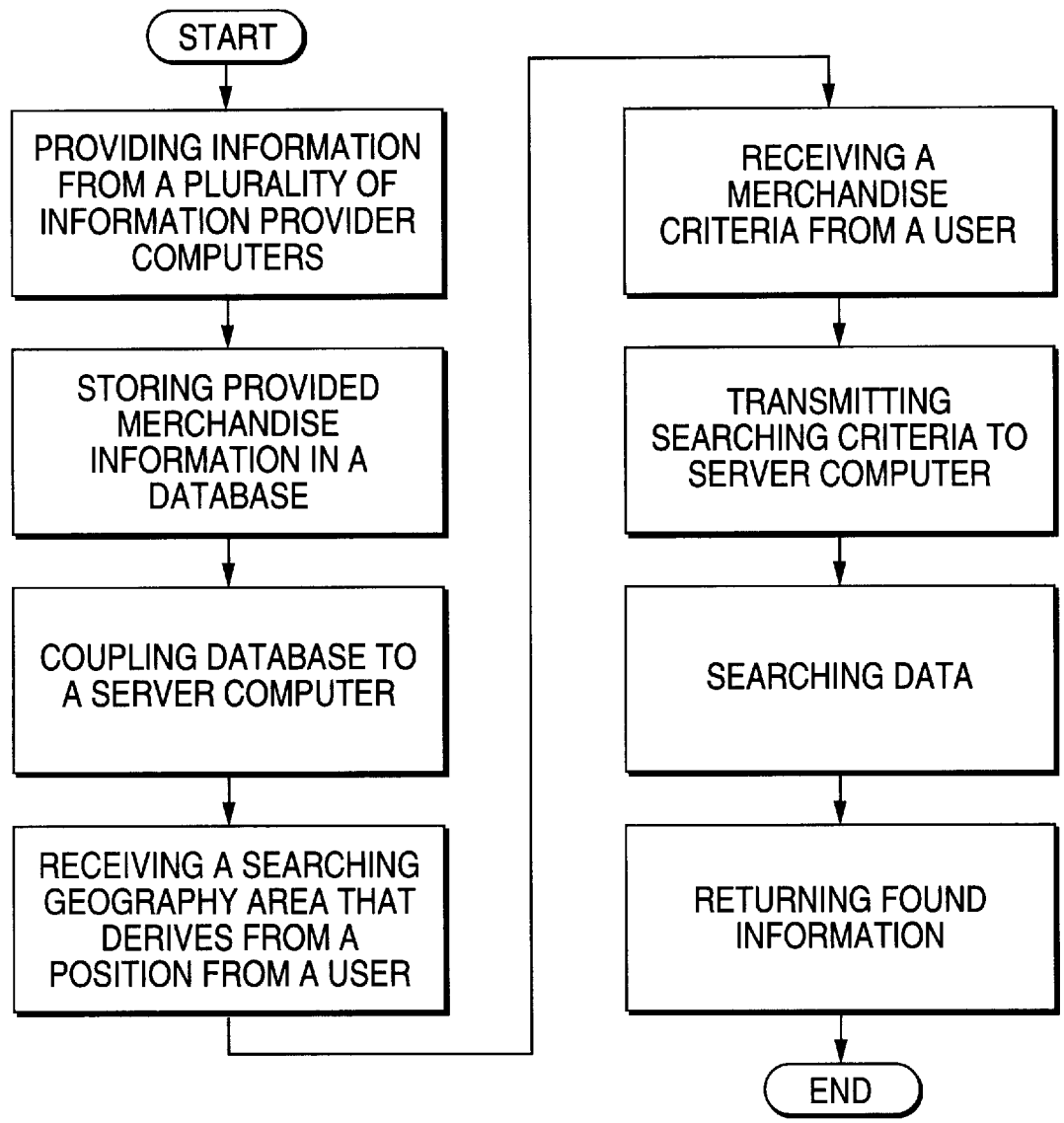
FIG. 19 shows a merchandise price search method flow chart.
Figure 20:
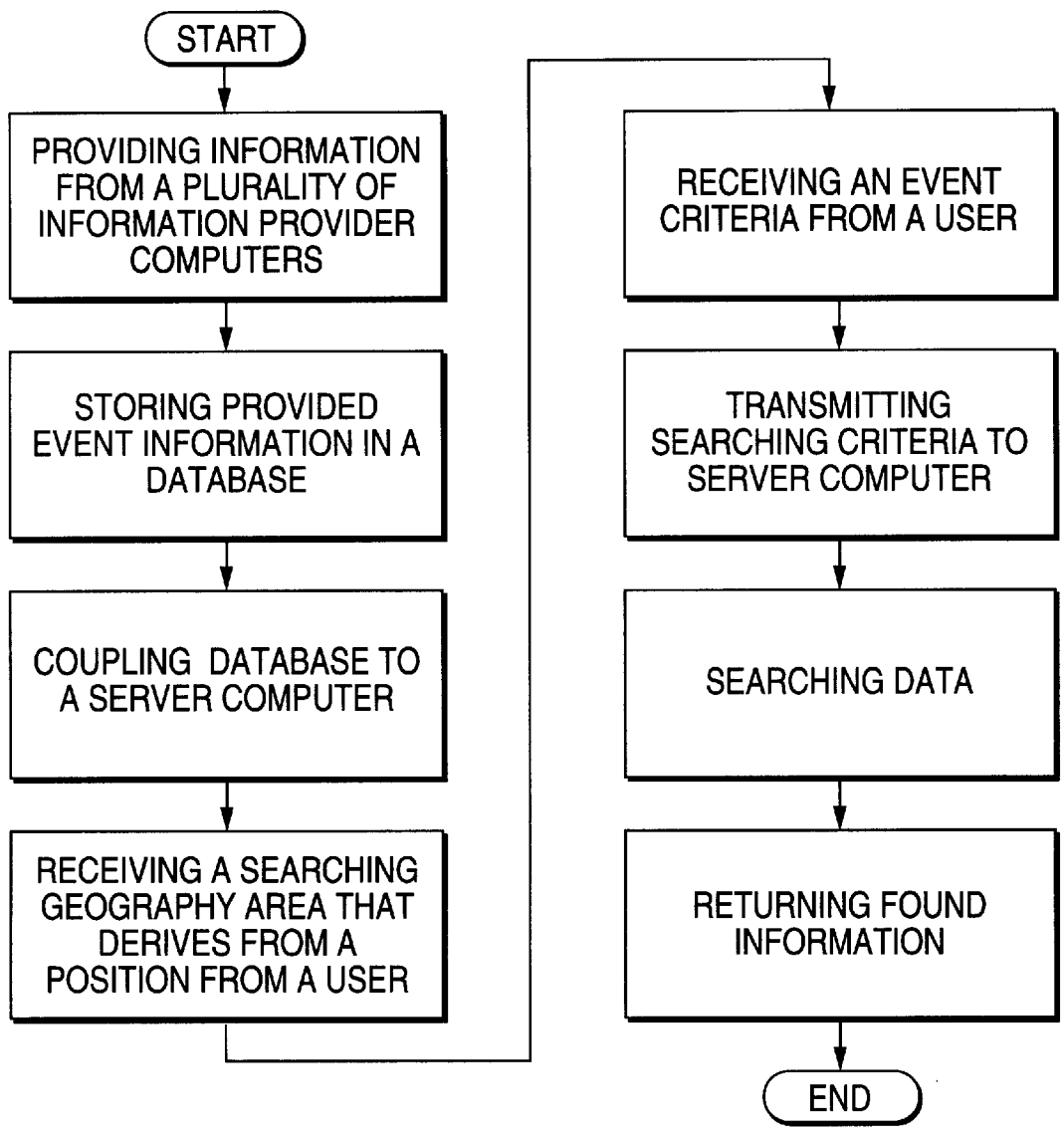
FIG. 20 shows an event information search method flow chart
Figure 21:
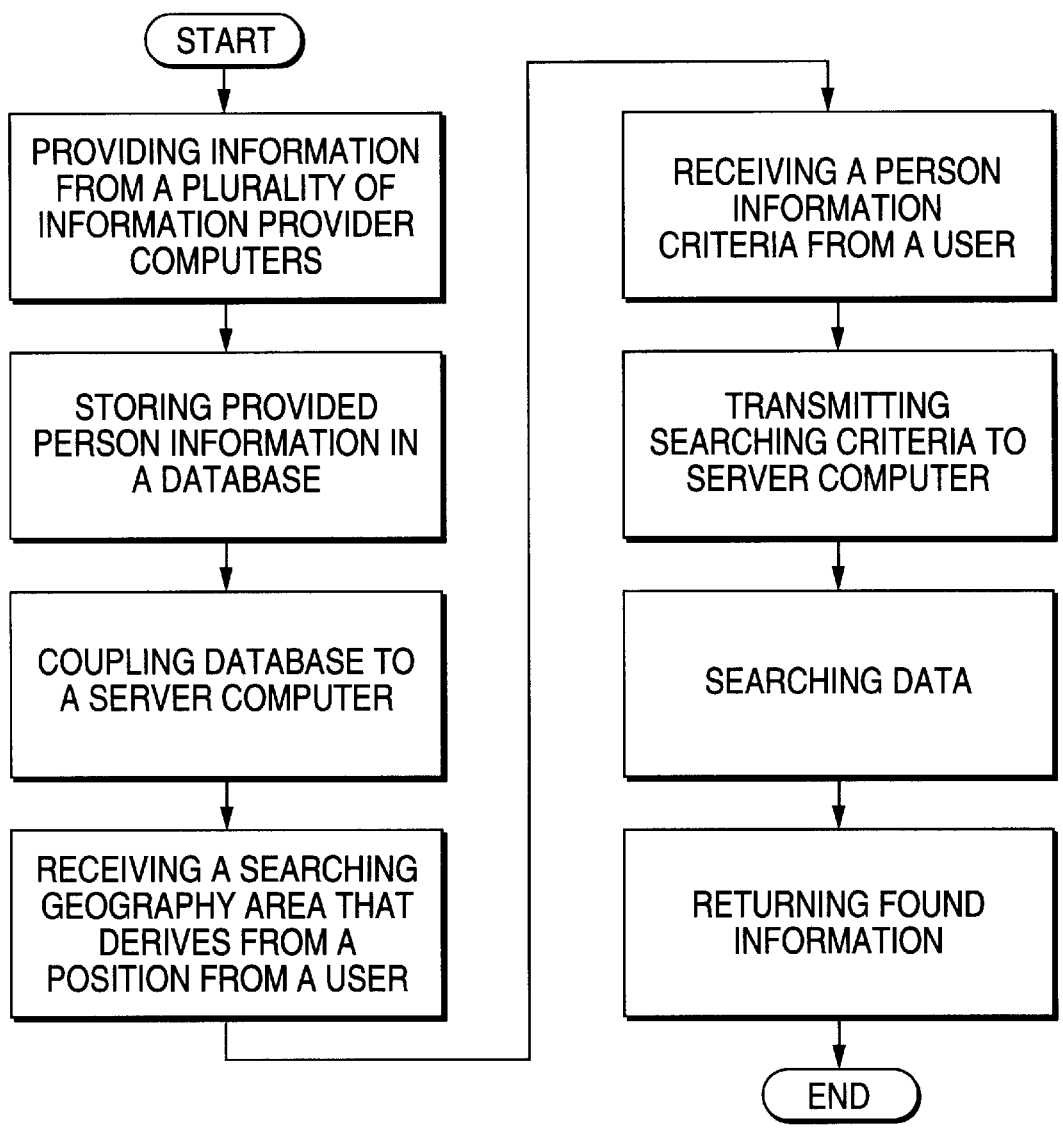
FIG. 21 shows a person information search method flow chart

FIGS. 19, 20, 21 show respectively a merchandise price search flow chart, an event information search flowchart, and a person information search flow chart.

The system could further help the user by providing a routing service because processor 31 knows each of received merchandise positions. The user requests a routing service by moving the cursor and clicking on an index number on map 67. Processor 31 then transmits the routing request to computer 10 through the Internet. The routing request includes current position and a destination position. The destination position is the position of the merchandise with the index that is selected by the user on the map. After receiving the routing request, processor 11 find a best route from the current position to the destination positions. The best route here is in terms of distance. However, the best route might also be in terms of time, if a real time traffic database is provided in computer system 10. In another embodiment, step 48 could also execute a routing processor on the processor 31 if a route database is provided on computer system 30.

The received merchandise position could also be used by a Global Position System receiver. Because the merchandise position is position coordinates of the Global Position System, the built-in computer on the receiver could continuously and seamlessly navigate the user to a merchandise location chosen by the user.

Although the description above contains many specific details, these should not be construed as limiting the scope of the invention but as merely providing illustrations of some of the presently preferred embodiments of this invention. Again, the database can be the merchandise information database, as well as being an event, personnel information database.

Thus the scope of the invention should be determined by the appended claims and their legal equivalents, rather than by the examples given.

What is claimed is:

1. A local information searching system to find any selected merchandise by using referencing position system, comprising:
    a plurality of information provider computers, which is a computer system used for providing information, said provided information including an identifier of merchandise information provider, a position of the merchandise, and a description of the merchandise, wherein said description includes a price information of the merchandise;
    a server computer that communicates with each of said plurality of information provider computers and couples to a database, said database containing said provided information;
    a plurality of information consumer computers, which is a computer system used for consuming said provided information, each of said plurality of information consumer computers including:
        a communication device for communicating with said server computer;
        a searching geographic area input means for receiving a searching geographic area and for storing said searching geographic area, wherein said searching geographic area is derived from a coordinate of a position coordinate system;
        a searching criteria input means for receiving a selection criteria and for storing said criteria, wherein said searching criteria is a criteria for description of the merchandise that includes a price criteria of a merchandise;
        a remote query means for transmitting said stored criteria and said stored searching geographic area to said server computer via said communication devices and a communication link, searching said information in said database via said server computer, receiving searching result from said server, and storing information of said searching results; and
        a searching result output means for outputting information of said searching results.

2. The local information searching system of claim 1, wherein said position coordinate system is Global Positioning Coordinate System.

3. The local information searching system of claim 1, wherein said searching geographic area is selected from the group consisting of:
    a coordinate of said position coordinate system and a geographic searching area constraint, and
    a coordinate of said position coordinate system and a default geographic searching area constraint.

4. The local information searching system of claim 3, wherein said coordinate of said position coordinate system is located by a positioning instrument that couples to said information consumer computer.

5. The local information searching system of claim 4, wherein said position instrument is a Global Positioning System receiver.

6. The local information searching system of claim 3, wherein said searching area constraint is selected from the group consisting of:
    a distance that is used to derive said searching geographic area by creating a circle centered at said coordinate,
    a ZIP code constraint that is used to derive said searching geographic area that is the ZIP code area where said coordinate is located,
    a government district constraint that is used to derive said searching geographic area that is the district where said coordinate is located,
    a street name that is used to derive said searching geographic area that is between said street and said coordinate, and
    a plurality of positions that is used to derive said searching geographic area that is enclosed by said coordinate and the plurality of positions.

7. The local information searching system of claim 1, wherein searching information in said database searches the database against said searching criteria and said searching geographic area and said searching results match said searching criteria and couple to at least one position which is located inside said searching geographic area.

8. The local information searching system of claim 1, wherein said searching result includes a coordinate of a position coordinate system.

9. The local information searching system of claim 8, wherein said position coordinate system is a position coordinate system of Global Positioning System.

10. The local information searching system of claim 1, wherein the position of the merchandise of said searching result is marked on a map.

11. The local information searching system of claim 1, wherein said searching result has a table that includes a field of identifier of merchandise information provider and a field of price of merchandise.

12. The local information searching system of claim 1, wherein said information consumer computer further comprises a navigation information output means outputting navigation information from the position of said consumer computer to the position of the merchandise of said searching results.

13. The local information searching system of claim 12, wherein said navigation information contains real time routing information from the position of said consumer computer to the position of the merchandise of said searching results.

14. The local information searching system of claim 12, wherein said navigation information contains the routing information in Global Positioning Coordinate System and said navigation information is output by a Global Positioning System application coupled to said consumer computer.

15. The local information searching system of claim 1, wherein said communication device in each of said plurality of consumer computers are industry-standard telecommunications modems.

16. The local information searching system of claim 1, wherein said communication device in each of said plurality of consumer computers is a network interface circuit.

17. The local information searching system of claim 1, wherein said communication device in each of said plurality of consumer computer is coupled via telephone line.

18. The local information searching system of claim 1, wherein said communication device in each of said plurality of consumer computer is coupled via a wireless connection.

19. A local information searching system to find any selected event by using referencing position system, comprising:
  a plurality of information provider computers, which is a computer system used for providing information, said provided information including an identifier of event sponsor, a position of the event, and a description of the event, wherein said description includes a time of the event;
  a server computer that communicates with each of said plurality of information provider computers and couples to a database, said database containing said provided information;
  a plurality of information consumer computers, which is a computer system used for consuming said provided information, each of said plurality of information consumer computers including:
    a communication device for communicating with said server computer;
    a searching geographic area input means for receiving a searching geographic area and for storing said searching geographic area, wherein said searching geographic area is derived from a coordinate of a position coordinate system;
    a searching criteria input means for receiving a selection criteria and for storing said criteria, wherein said searching criteria is a criteria for description of the event that includes a time criteria of the event;
    a remote query means for transmitting said stored criteria and said stored searching geographic area to said server computer via said communication devices and a communication link, searching said information in said database via said server computer, receiving searching result from said server, and storing information of said searching results; and
    a searching result output means for outputting information of said searching results.

20. The local information searching system of claim 19, wherein said position coordinate system is Global Positioning Coordinate System.

21. The local information searching system of claim 19, wherein said searching geographic area is selected from the group consisting of
  a coordinate of said position coordinate system and a geographic searching area constraint, and
  a coordinate of said position coordinate system and a default geographic searching area constraint.

22. The local information searching system of claim 19, wherein said coordinate of said position coordinate system is located by a position instrument that couples to said information consumer computer.

23. The local information searching system of claim 22, wherein said positioning instrument is a Global Positioning System receiver.

24. The local information searching system of claim 19, wherein said searching area constraint is selected from the group consisting of:
  a distance that is used to derive said searching geographic area by creating a circle centered at said coordinate,
  a ZIP code constraint that is used to derive said searching geographic area that is the ZIP code area where said coordinate is located,
  a government district constraint that is used to derive said searching geographic area that is the district where said coordinate is located,
  a street name that is used to derive said searching geographic area that is between said street and said coordinate, and
  a plurality of positions that are used to derive said searching geographic area that is enclosed by said coordinate and the plurality of positions.

25. The local information searching system of claim 19, wherein searching information in said database searches the database against said searching criteria and said searching geographic area and said searching results match said criteria and couple to at least one position which is located inside said searching geographic area.

26. The local information searching system of claim 19, wherein said searching result includes a coordinate of said position coordinate system.

27. The local information searching system of claim 26, wherein said position coordinate system is a position coordinate system of Global Positioning System.

28. The local information searching system of claim 19, wherein the position of the event of said searching result is marked on a map.

29. The local information searching system of claim 19, wherein said searching result has a table that includes a field of identifier of event sponsor and a field of description of event.

30. The local information searching system of claim 19, wherein said information consumer computer further comprising a navigation information output means outputting navigation information from the position of said consumer computer to the position of the event of said searching results.

31. The local information searching system of claim 30, wherein said navigation information contains real time routing information from the position of said consumer computer to the position of the event of said searching results.

32. The local information searching system of claim 30, wherein said navigation information contains the routing information in Global Positioning Coordinate System and said navigation information is output by a Global Positioning System application coupled to said consumer computer.

33. The local information searching system of claim 19, wherein said communication device in each of said plurality of consumer computers are industry-standard telecommunications modems.

34. The local information searching system of claim 19, wherein said communication device in each of said plurality of consumer computers is a network interface circuit.

35. The local information searching system of claim 19, wherein said communication device in each of said plurality of consumer computer is coupled via telephone line.

36. The local information searching system of claim 19, wherein said communication device in each of said plurality of consumer computer is coupled via a wireless connection.

37. A local information searching system to find any selected person by using referencing position system, comprising:
- a plurality of information provider computers, which is a computer system used for providing information, said provided information including an identifier of the person, a position of the person, and a personnel information of the person;
- a server computer that communicates with each of said plurality of information provider computers and couples to a database, said database containing said provided information;
- a plurality of information consumer computers, which is a computer system used for consuming said provided information, each of said plurality of information consumer computers including
  - a communication device for communicating with said server computer;
  - a searching geographic area input means for receiving a searching geographic area and for storing said searching geographic area, wherein said searching geographic area is derived from a coordinate of a position coordinate system;
  - a searching criteria input means for receiving a selection criteria and for storing said criteria, wherein said searching criteria includes personnel criteria;
  - a remote query means for transmitting said stored criteria and said stored searching geographic area to said server computer via said communication devices and a communication link, searching said information in said database via said server computer, receiving searching result from said server, and storing information of said searching results; and
  - a searching result output means for outputting information of said searching results.

38. The local information searching system of claim 37, wherein said position coordinate system is Global Positioning Coordinate System.

39. The local information searching system of claim 37, wherein said searching geographic area is selected from the group consisting of:
- a coordinate of said position coordinate system and a geographic searching area constraint, and
- a coordinate of said position coordinate system and a default geographic searching area constraint.

40. The local information searching system of claim 39, wherein said coordinate of said position coordinate system is located by a positioning instrument that couples to said information consumer computer.

41. The local information searching system by using referencing system of claim 40, wherein said positioning instrument is a Global Positioning System receiver.

42. The local information searching system of claim 39, wherein said searching area constraint is selected from the group consisting of:
- a distance that is used to derive said searching geographic area by creating a circle centered at said coordinate,
- a ZIP code constraint that is used to derive said searching geographic area that is the ZIP code area where said coordinate is located,
- a government district constraint that is used to derive said searching geographic area that is the district where said coordinate is located,
- a street name that is used to derive said searching geographic area that is between said street and said position, and
- a plurality of position that is used to derive said searching geographic area that is enclosed by said coordinate and the plurality of positions.

43. The local information searching system of claim 37, wherein searching information in said database searched the database against said criteria and said searching geographic area and said searching results match said searching criteria and couple to at least one position which is located inside said searching area.

44. The local information searching system of claim 37, wherein said searching result includes a coordinate of a position coordinate system.

45. The local information searching system of claim 44, wherein said position coordinate system is a position coordinate system of Global Positioning System.

46. The local information searching system of claim 37, wherein the position of the person of said searching result is marked on a map.

47. The local information searching system of claim 37, wherein said searching result has a table that includes a field of identifier of person and a field of personnel information.

48. The local information searching system of claim 37, wherein said information consumer computer further comprises a navigation information output means outputting navigation information from the position of said consumer computer to the position of the person of said searching results.

49. The local information searching system of claim 48, wherein said navigation information contains real time routing information from the position of said consumer computer to the position of the person of said searching results.

50. The local information searching system of claim 48, wherein said navigation information contains the routing information in Global Positioning Coordinate System and said navigation information is output by a Global Positioning System application coupled to said consumer computer.

51. The local information searching system of claim 37, wherein said communication device in each of said plurality of consumer computers are industry-standard telecommunications modems.

52. The local information searching system of claim 37, wherein said communication device in each of said plurality of consumer computers is a network interface circuit.

53. The local information searching system of claim 37, wherein said communication device in each of said plurality of consumer computer is coupled via telephone line.

54. The local information searching system of claim 37, wherein said communication device in each of said plurality of consumer computer is coupled via a wireless connection.

55. A method of searching local information by using referencing position system comprising the steps of:
- providing information from a plurality of information provider computers;
- storing said provided information in a database, said provided information including an identifier of merchandise information provider, a position of merchandise, and description of merchandise, wherein said description includes price of merchandise;
- coupling said database to a server computer, wherein said server computer is able to access said database;
- receiving a searching geographic area from one of a plurality of consumer computers, said searching geographic area is derived from a coordinate of a position coordinate system;
- receiving a searching criteria for specifying one or more of said provided information, said searching criteria includes a price criteria of merchandise;
- transmitting said searching geographic area input and said searching criteria input from said consumer computer to said server computer;
- searching said database by said server computer for said provided information that matches said searching criteria and couples to at least one position in said searching geographic area;
- returning the information of said searching result to said consumer computer; and
- outputting the information of said searching result.

56. The method of claim 55, wherein said position coordinate system is Global Positioning Coordinate System.

57. The method of claim 55, wherein said step of outputting the information of said searching result includes marking the information on a map.

58. The method of claim 55, wherein said step of outputting the information of said searching result includes outputting a table that includes a field of identifier of merchandise information provider and a field of price of merchandise.

59. The method of claim 55, wherein said searching geographic area is selected from the group consisting of:
- a coordinate of said position coordinate system and a geographic searching area constraint, and
- a coordinate of said position coordinate system and a default geographic searching area constraint.

60. The methods of claim 59, wherein said coordinate of said position coordinate system is located by a positioning instrument that couples to said information consumer computer.

61. The local information searching system of claim 60, wherein said positioning instrument is a Global Positioning System receive.

62. The method of claim 59, wherein said searching area constraint is selected from the group consisting of:
- a distance that is used to derive said searching geographic area by creating a circle centered at said coordinate,
- a ZIP code constraint that is used to derive said searching geographic area that is the ZIP code area where said coordinate is located,
- a government district constraint that is used to derive said searching geographic area that is the district where said coordinate is located,
- a street name that is used to derive said searching geographic area that is between said street and said coordinate, and
- a plurality of position that is used to derive said searching geographic area that is enclosed by said coordinate and the plurality of positions.

63. The method of claim 55, wherein industry-standard telecommunications modems are used for said transmitting and returning information between server computer and said a plurality of information consumer computers.

64. The method of claim 55, wherein said server computer and said a plurality of information consumer computers couple to industry-standard telecommunications modems for transmitting and returning information.

65. The method of claim 55, wherein said server computer and said plurality of information consumer computers couple to a high-speed router for transmitting and returning information.

66. The method of claim 55, wherein said information transmitting and returning between server computer and said a plurality of information consumer computers is through a wireless connection.

67. The method of claim 55, wherein outputting said searching result includes outputting coordinates of said position coordinate system.

68. The method of claim 55, further composing the step of outputting navigation information, wherein said navigation information is the information from the position of said consumer computer to the position of the information of said searching results.

69. The method of claim 68, wherein said navigation information contains real time routing information from the position of said consumer computer to the position of the information of said searching results.

70. The method of claim 68, wherein
- said navigation information contains the routing information in Global Positioning Coordinate System; and
- said navigation information output is output by a Global Positioning System application coupled to said consumer computer.

71. A method of searching local information by using referencing position system comprising the steps of:
- providing information from a plurality of information provider computers;
- storing said provided information in a database, said provided information including an identifier of event sponsor, a position of event, and a description of event, said description of event including a time of event;
- coupling said database to a server computer, wherein said server computer is able to access said database;
- receiving a searching geographic area from one of a plurality of consumer computers, said searching geographic area is derived from a coordinate of a position coordinate system;
- receiving a searching criteria specifying said provided information;
- transmitting said searching geographic area input and said searching criteria input from said consumer computer to said server computer;
- searching said database by said server computer for said provided information that matches said searching criteria and couples to at least one position in said searching geographic area; and
- returning the information of said searching result to said consumer computer; and
- outputting the information of said searching result.

72. The method of claim 71, wherein said position coordinate system is Global Positioning Coordinate System.

73. The method of claim 71, wherein said step of outputting the information of said searching result includes marking the information on a map.

74. The method of claim 71, wherein said step of outputting the information of said searching result includes outputting a table that includes a field of identifier of event sponsor and a filed of description of event.

75. The method of claim 71, wherein said searching geographic area is selected from the group consisting of:
   a coordinate of said position coordinate system and a geographic searching area constraint, and
   a coordinate of said position coordinate system and a default geographic searching area constraint.

76. The method of claim 75, wherein said coordinate of said position coordinate system is located by a positioning instrument that couples to said information consumer computer.

77. The local information searching system of claim 76, wherein said positioning instrument is a Global Positioning System receiver.

78. The method of claim 75, wherein said searching area constraint is selected from the group consisting of:
   a distance that is used to derive said searching geographic area by creating a circle centered at said coordinate,
   a ZIP code constraint that is used to derive said searching geographic area that is the ZIP code area where said coordinate is located,
   a government district constraint that is used to derive said searching geographic area that is the district where said coordinate is located,
   a street name which is used to derive an searching geographic area that is between said street and said coordinate, and
   a plurality of position which is used to derive an searching geographic area that is enclosed by said coordinate and the plurality of positions.

79. The method of claim 71, wherein industry-standard telecommunications modems are used for said transmitting and returning information between server compute and said a plurality of information consumer computers.

80. The method of claim 71, wherein said server computer and said a plurality of information consumer computers couple to industry-standard telecommunications modems for transmitting and returning information.

81. The method of claim 71, wherein said server computer and said a plurality of information consumer computers couple to a high-speed router for transmitting and returning information.

82. The method of claim 71, wherein said information transmitting and returning between server computer and said a plurality of information consumer computers is through a wireless connection.

83. The method of claim 71, wherein said outputting searching result includes outputting coordinates of said position coordinate system.

84. The method of claim 71, further comprising the step of outputting navigation information, said navigation information is the information from said position of said consumer computer to the position of the information of said searching results.

85. The method of claim 84, wherein said navigation information contains real time routing information from said position of said consumer computer to the position of the information of said searching results.

86. The method of claim 84, wherein
   said navigation information contains the routing information in Global Positioning Coordinate System; and
   said navigation information output is output by a Global Positioning System application coupled to said consumer computer.

87. A method of searching local information by using referencing position system comprising the steps of:
   providing information from a plurality of information provider computers;
   storing said provided information in a database, said provided information including an identifier of person, a position of person, and a personnel information;
   coupling said database to a server computer, wherein said server computer is able to access said database;
   receiving a searching geographic area from one of a plurality of consumer computers, said searching geographic area is derived from a coordinate of a position coordinate system;
   receiving a searching criteria specifying one or more of said provided information;
   transmitting said searching geographic area input and said searching criteria input from said consumer computer to said server computer;
   searching said database by said server computer for said provided information that matches said searching criteria and couples to at least one position in said searching geographic area;
   returning the information of said searching result to said consumer computer; and
   outputting the information of said searching result.

88. The method of claim 87, wherein said position coordinate system is Global Positioning Coordinate System.

89. The method of claim 87, wherein said step of outputting the information of said searching result includes marking the information on a map.

90. The method of claim 87, wherein said step of outputting the information of said searching result includes outputting a table that includes a field of identifier of person and a field of personnel information.

91. The method of claim 87, wherein said searching geographic area is selected from the group consisting of:
   a coordinate of said position coordinate system and a geographic searching area constraint, and
   a coordinate of said position coordainte system and a default geographic searching area constraint.

92. The method of claim 91, wherein said coordinate of a position coordinate system is located by a positioning instrument that couples to said information consumer computer.

93. The local information searching system of claim 92, wherein said positioning instrument is a Global Positioning System receiver.

94. The method of claim 91, wherein said searching area constraint is selected from the group consisting of:
   a distance that is used to derive said searching geographic area by creating a circle centered at said coordinate,
   a ZIP code constraint that is used to derive said searching geographic area that is the ZIP code area where said coordinate is located,
   a government district constraint that is used to derive said searching geographic area that is the district where said coordinate is located,
   a street name which is used to derive an searching geographic area that is between said street and said coordinate, and
   a plurality of position that is used to derive an searching geographic area that is enclosed by said coordinate and the plurality of position.

95. The method of claim 87, wherein industry-standard telecommunications modems are used for said transmitting and returning information between server computer and said a plurality of information consumer computers.

96. The method of claim 87, wherein said server computer and said a plurality of information consumer computers couple to industry-standard telecommunications modems for transmitting and returning information.

97. The method of claim 87, wherein said server computer and said a plurality of information consumer computers couple to a high-speed router for transmitting and returning information.

98. The method of claim 87, wherein said information transmitting and returning between server computer and said a plurality of information consumer computers is through a wireless connection.

99. The method of claim 87, wherein said outputting searching result includes outputting coordinates of said position coordinate system.

100. The method of claim 87, further comprising the step of outputting navigation information, wherein said navigation information is the information from said position of said consumer computer to the position of the information of said searching results.

101. The method of claim 100, wherein said navigation information contains real time routing information from said position of said consumer computer to the position of the information of said searching results.

102. The method of claim 100, wherein said navigation information contains the routing information in Global Positioning Coordinate System; and said navigation information output is output by a Global Positioning System application coupled to said consumer computer.

* * * * *